(12) United States Patent  
Okamoto et al.

(10) Patent No.: US 8,584,249 B2  
(45) Date of Patent: Nov. 12, 2013

(54) SYSTEM FOR PREVENTING UNAUTHORIZED USE OF DIGITAL CONTENT

(75) Inventors: Akiyoshi Okamoto, Nara (JP); Masataka Ishida, Nara (JP)

(73) Assignee: Phu Sang Ltd., LLC, Wilmington, DE (US)

( * ) Notice: Subject to any disclaimer, the term of this patent is extended or adjusted under 35 U.S.C. 154(b) by 1923 days.

(21) Appl. No.: 10/533,583

(22) PCT Filed: Jan. 30, 2004

(86) PCT No.: PCT/JP2004/000979  
§ 371 (c)(1),  
(2), (4) Date: May 3, 2005

(87) PCT Pub. No.: WO2004/102395  
PCT Pub. Date: Nov. 25, 2004

(65) Prior Publication Data  
US 2006/0085859 A1    Apr. 20, 2006

(30) Foreign Application Priority Data  
May 16, 2003    (JP) .................................. 2003-139688

(51) Int. Cl.  
*H04L 29/06* (2006.01)

(52) U.S. Cl.  
USPC ............. 726/26; 713/156; 713/157; 713/173; 705/51; 705/52; 705/53; 705/59

(58) Field of Classification Search  
USPC .......................................................... 726/26  
See application file for complete search history.

(56) References Cited

U.S. PATENT DOCUMENTS

| | | | |
|---|---|---|---|
| 5,302,954 A | 4/1994 | Brooks | |
| 5,689,560 A | 11/1997 | Cooper | |

(Continued)

FOREIGN PATENT DOCUMENTS

| | | |
|---|---|---|
| AU | 14856/95 A | 11/1995 |
| AU | 763878 B2 | 5/2000 |

(Continued)

OTHER PUBLICATIONS

Schulzrinne, Henning. A Comprehensive Multimedia Control Architecture for the Internet. Proceedings of the IEEE 7th International Workshop on Network and Operating System Support for Digital Audio and Video. Pub. Date: 1997. Relevant pp. 65-76. Found on the World Wide Web at: http://ieeexplore.ieee.org/stamp/stamp.jsp?tp=&arnumber=629366.*

(Continued)

*Primary Examiner* — Nathan Flynn  
*Assistant Examiner* — Jeremiah Avery  
(74) *Attorney, Agent, or Firm* — Christensen O'Connor Johnson Kindness PLLC

(57) ABSTRACT

A system for preventing unauthorized use of digital content that can prevent unauthorized use of digital content and can reliably collect a charge for secondary use is provided. The system for preventing unauthorized use may include: a distributing recording medium α on which a content file having header information "A" and a data body "B" is recorded in a state of lacking play information "A1" indispensable for playing the data body "B" included in the header information a; a management center managing use of the content file on the distributing recording medium α and which can deliver the prepared play information "A1" of the header information "A" as piece data via a communication line β; and a digital content playing device which is a device used for playing the content file on the distributing recording medium α and has a function of communicating via the communication line β with the management center.

17 Claims, 12 Drawing Sheets

(56) References Cited

U.S. PATENT DOCUMENTS

| | | | |
|---|---|---|---|
| 5,757,907 A | 5/1998 | Cooper | |
| 5,761,651 A | 6/1998 | Hasebe | |
| 5,825,879 A | 10/1998 | Davis | |
| 5,870,031 A | 2/1999 | Kaiser | |
| 5,892,900 A | 4/1999 | Ginter | |
| 5,923,885 A | 7/1999 | Johnson | |
| 6,134,130 A | 10/2000 | Connell | |
| 6,226,618 B1 | 5/2001 | Downs | |
| 6,367,019 B1 * | 4/2002 | Ansell et al. | 726/26 |
| 6,507,908 B1 * | 1/2003 | Caronni | 713/153 |
| 6,963,859 B2 * | 11/2005 | Stefik et al. | 705/51 |
| 7,017,188 B1 * | 3/2006 | Schmeidler et al. | 726/26 |
| 7,035,828 B2 * | 4/2006 | Ketonen et al. | 705/51 |
| 7,162,642 B2 * | 1/2007 | Schumann et al. | 713/189 |
| 7,218,738 B2 | 5/2007 | Pedlow, Jr. | |
| 7,222,104 B2 * | 5/2007 | Tadayon et al. | 705/54 |
| 7,228,738 B2 | 6/2007 | Acar | |
| 7,243,366 B2 * | 7/2007 | Medvinsky et al. | 726/2 |
| 7,302,059 B2 | 11/2007 | Candelore | |
| 2002/0021805 A1 * | 2/2002 | Schumann et al. | 380/201 |
| 2002/0143807 A1 | 10/2002 | Komatsu | |
| 2003/0040962 A1 | 2/2003 | Lewis | |
| 2003/0135467 A1 | 7/2003 | Okamoto | |
| 2004/0028227 A1 | 2/2004 | Yu | |
| 2004/0030912 A1 * | 2/2004 | Merkle et al. | 726/26 |

FOREIGN PATENT DOCUMENTS

| | | |
|---|---|---|
| BR | 9501522-1 A | 11/1995 |
| CA | 2145925 C | 10/1995 |
| CN | 1115059 A | 1/1996 |
| DE | 102 09 400 A1 | 10/2003 |
| EP | 0 679 979 A1 | 11/1995 |
| EP | 0 681 297 A2 | 11/1995 |
| EP | 1 039 392 A1 | 9/2000 |
| EP | 1 302 882 A1 | 4/2003 |
| JP | 01-253051 A | 10/1989 |
| JP | 01-296362 | 11/1989 |
| JP | 04-054529 A | 2/1992 |
| JP | 04-104325 A | 4/1992 |
| JP | 04-200125 A | 7/1992 |
| JP | 05-316079 A | 11/1993 |
| JP | 07-86721 A | 3/1995 |
| JP | 07-234785 A | 9/1995 |
| JP | 07-295803 A | 11/1995 |
| JP | 08-054952 A | 2/1996 |
| JP | 09-008797 A | 1/1997 |
| JP | 10-240517 A | 9/1998 |
| JP | 10-269077 A | 10/1998 |
| JP | 10-269078 A | 10/1998 |
| JP | 11-025110 A | 1/1999 |
| JP | 11-102468 A | 4/1999 |
| JP | 11-149707 A | 6/1999 |
| JP | 11-203127 A | 7/1999 |
| JP | 11-316729 A | 11/1999 |
| JP | 11-345261 A | 12/1999 |
| JP | 11-515143 A | 12/1999 |
| JP | 2000-049765 A | 2/2000 |
| JP | 2000-069452 A | 3/2000 |
| JP | 2000-098655 A | 4/2000 |
| JP | 2000-115162 A | 4/2000 |
| JP | 2000-115766 A | 4/2000 |
| JP | 2000-123084 A | 4/2000 |
| JP | 2000-124890 A | 4/2000 |
| JP | 2000-138673 A | 5/2000 |
| JP | 2000-188595 A | 7/2000 |
| JP | 2000-242699 A | 9/2000 |
| JP | 2001-265122 A | 9/2001 |
| JP | 2001-268523 | 9/2001 |
| JP | 2001-338049 | 12/2001 |
| JP | 2001-338049 A | 12/2001 |
| JP | 2002-007914 | 1/2002 |
| JP | 2002-16899 | 1/2002 |
| JP | 2002-278859 | 9/2002 |
| JP | 2002-334172 | 11/2002 |
| JP | 2002-352153 | 12/2002 |
| JP | 2003-132234 A | 5/2003 |
| JP | 2004-095732 A | 3/2004 |
| JP | 2008-523595 A | 7/2008 |
| KR | 200444 | 6/1999 |
| KR | 1020000018052 A | 4/2000 |
| WO | 98/53411 A1 | 11/1998 |
| WO | 00/22539 A1 | 4/2000 |
| WO | 01/93134 A1 | 12/2001 |
| WO | 03/036538 A1 | 5/2003 |
| WO | 2005/027216 A3 | 3/2005 |

OTHER PUBLICATIONS

"Observations by a Third Party," dated Nov. 7, 2003, relating to EP 1 302 882 A1, U.S. Patent Application No. 5,892,900, and WO 01-093134, 16 pages.

"System Strategy: Culture Convenience Club," Nikkei Computer, No. 491, Mar. 13, 2000, pp. 170-175. (Attached is an explanation in English relating to citation by Examiner.).

* cited by examiner

SYSTEM FOR PREVENTING UNAUTHORIZED USE OF DIGITAL CONTENT

BACKGROUND

As such prior art example, the following system is proposed. Basically, the system has: a distributing recording medium such as a CD-ROM on which encrypted digital content are recorded; management means for managing a charge for use of the digital content of a user; and a digital content playing device which is a device used for playing the digital content by the user who has obtained the distributing recording medium and can be connected via the Internet line to the management means, wherein when a request to play the digital content under authentication and charging conditions is inputted by the user to the digital content playing device, the digital content playing device transmits the request via the Internet line to the management means, the management means checks authentication and charging of the user related to the request to transmit decryption key data via the Internet line to the digital content playing device, and the digital content playing device uses the decryption key data to decrypt and play the digital content on the distributing recording medium (for example, see Patent Document 1). "Patent Document 1: Japanese Patent Application Laid-Open No. 2002-334172"

In the above prior art example, however, when the digital content on the distributing recording medium are once decrypted by the digital content playing device, the digital content can be not only played but also easily copied. There is an essential disadvantage that secondary unauthorized use cannot be prevented.

Although addition of a function of automatically deleting the digital content when a predetermined period has elapsed from the play request can at least prevent the secondary unauthorized use, there is another disadvantage that collection of a charge for the secondary use cannot be expected. This is not a specific problem faced only when distributing the digital content via the distributing recording medium to the user, and is alike when delivering the digital content via the Internet line to the user. The advantage to be originally obtained by such as a content holder is lost in an unauthorized manner. In this point, under the current circumstances, the distribution of the digital content is prevented from being promoted.

The present disclosure has been made under the above background and an object of the present disclosure is to provide a system for preventing unauthorized use of digital content which can prevent unauthorized use of digital content and can reliably collect a charge for secondary use.

SUMMARY

To solve the above problems, a first system for preventing unauthorized use of digital content according to the present disclosure has: a distributing recording medium which is a recording medium on which a content file having header information and a data body is recorded and lacks part of the header information to prevent unauthorized play and unauthorized copy of the data body; management means which is means managing use of the content file on the distributing recording medium and can transfer the prepared part of the header information as piece data via a communication line; and a digital content playing device which is a device used for at least playing the content file on the distributing recording medium and has a function of communicating via the communication line with the management means, wherein when a request to play the content file under authentication and charging conditions is inputted by a user to the digital content playing device, the digital content playing device transfers the request via the communication line to the management means, the management means checks authentication and charging of the user related to the request to transfer the piece data via the communication line to the digital content playing device, and the digital content playing device uses the header information on the distributing recording medium and the piece data only in play operation to play the data body on the distributing recording medium.

Alternatively, the first system for preventing unauthorized use of digital content has: a distributing recording medium on which a content file having header information and a data body is recorded in a state of lacking at least part of the header information (that is, play information indispensable for playing the data body included in the header information); management means which is means managing use of the content file on the distributing recording medium and can transmit the prepared part of the header information as piece data via a communication line; and a digital content playing device which is a device used for at least playing the content file on the distributing recording medium and has a function of communicating via the communication line with the management means, wherein when a request to play the content file is inputted by a user to the digital content playing device, the digital content playing device transmits the request via the communication line to the management means, the management means checks authentication of the user related to the request to transmit the piece data of the content file related to the request via the communication line to the digital content playing device, and the digital content playing device uses the header information on the distributing recording medium and the piece data in play operation to play the data body on the distributing recording medium. In this case, the request to play the content file by the user is desirably made under an authentication and/or charging condition of the user.

A distributing recording medium fabrication device used for the system for preventing unauthorized play of digital content used for the first system for preventing unauthorized use of digital content separates piece data from a content file having header information and a data body for recording and records the content file separated from the piece data on a set recording medium to create a distributing recording medium.

A digital content playing device used for the first system for preventing unauthorized play of digital content has functions of: when a request to play a content file under an authentication condition is inputted by the user, transmitting the request via the communication line to the management means; and thereafter, when piece data is transmitted from the management means via the communication line, using the header information on the distributing recording medium and the piece data in play operation to play the data body on the distributing recording medium. Playing software used for the first system for preventing unauthorized play of digital content is alike.

A second system for preventing unauthorized use of digital content according to the present disclosure has: delivery management means delivering a content file having header information and a data body via a communication line and managing use of the data body; and a digital content playing device capable of communicating via the communication line with the delivery management means and used for at least playing the content file delivered from the delivery management means, wherein when a request to download the content file is inputted by a user to the digital content playing device, the digital content playing device transfers the request via the communication line to the delivery management means, and the delivery management means transfers the content file related to the request via the communication line to the digital content playing device by lacking part of the header information to prevent unauthorized play and unauthorized copy thereof, thereafter, when a request to play the content file under authentication and charging conditions is inputted by the user to the digital content playing device, the digital content playing device transfers the request via the communication line to the delivery management means, the delivery management means checks authentication and charging of the user related to the request to transfer the prepared part of the header information as piece data via the communication line to the digital content playing device, and the digital content playing device uses the header information of the transferred content file and the piece data only in play operation to play the data body of the content file.

Alternatively, the second system for preventing unauthorized use of digital content has: delivery management means which is a server in which a content file having header information and a data body is prepared in a state of lacking part of the header information (that is, play information indispensable for playing the data body included in the header information) and the part of the header information is prepared as piece data, delivers the content file via a communication line, and manages use of the data body; and a digital content playing device capable of communicating via the communication line with the delivery management means and used for at least playing the content file delivered from the delivery management means, wherein when a request to download the content file is inputted by a user to the digital content playing device, the digital content playing device transmits the request via the communication line to the delivery management means, and the delivery management means transmits the content file related to the request via the communication line to the digital content playing device, thereafter, when a request to play the content file is inputted by the user to the digital content playing device, the digital content playing device transmits the request via the communication line to the delivery management means, the delivery management means checks authentication of the user related to the request to transmit the piece data of the content file related to the request via the communication line to the digital content playing device, and the digital content playing device uses the header information of the transmitted content file and the piece data in play operation to play the data body of the content file. In this case, the request to play the content file by the user is desirably made under an authentication and/or charging condition of the user.

A digital content playing device used for the second system for preventing unauthorized play of digital content has functions of: when a request to download a content file is inputted by the user, transmitting the request via the communication line to the delivery management means; after the content file is transmitted from the delivery management means, when a request to play the content file under an authentication condition is inputted by the user, transmitting the request via the communication line to the delivery management means; and thereafter, when piece data is transmitted from the delivery management means via the communication line, using the header information of the transmitted content file and the piece data in play operation to play the data body of the content file. Playing software used for the second system for preventing unauthorized play of digital content of the present disclosure is alike.

In the first or second system for preventing unauthorized play of digital content of the present disclosure, preferably, when the playing software is prepared in the management means or the delivery management means, and when a request to download the playing software is inputted by the user to the digital content playing device, the digital content playing device transmits the request via the communication line to the management means or the delivery management means, the management means or the delivery management means transmits the playing software related to the request via the communication line to the digital content playing device, and the digital content playing device downloads the playing software.

The digital content playing device desirably has functions of: determining an elapsed period from the point of time at which piece data is transmitted from the management means or the delivery management means; and when the elapsed period reaches a predetermined period, deleting the transmitted piece data. Playing software is desirably alike. The digital content playing device can also have functions of: determining an elapsed time from the point of time at which, aside from piece data, a content file is transmitted from the delivery management means; and when the elapsed period reaches a predetermined period, deleting the transmitted content file.

In a digital content unauthorized play prevention method of the present disclosure, provided that to prevent unauthorized play and unauthorized copy of a data body of a content file having header information and the data body in a digital content playing device, part of the header information is lacked from the content file, and that the part of the header information is prepared as piece data in management means which is means managing use of the content file in the device and communicable via a communication line with the device, when a request to play the content file under authentication and charging conditions is inputted by a user to the device, the device transfers the request via the communication line to the management means, the management means checks authentication and charging of the user related to the request to transfer the piece data via the communication line to the device, and the device uses the header information of the content file and the piece data only in play operation to play the data body of the content file.

Alternatively, in the digital content unauthorized play prevention method, provided that to prevent unauthorized play of a data body of a content file having header information and the data body in a digital content playing device, part of the header information is lacked from the content file, and that the part of the header information is prepared as piece data in management means which is means managing use of the content file in the device and communicable via a communication line with the device, when a request to play the content file under an authentication condition is inputted by a user to the device, the device transmits the request via the communication line to the management means, the management means checks authentication of the user related to the request to transmit the piece data on the content file related to the request via the communication line to the device, and the device uses the header information of the content file and the piece data in play operation to play the data body of the content file.

EXPLANATION OF THE REFERENCE NUMERALS

Figure 1:
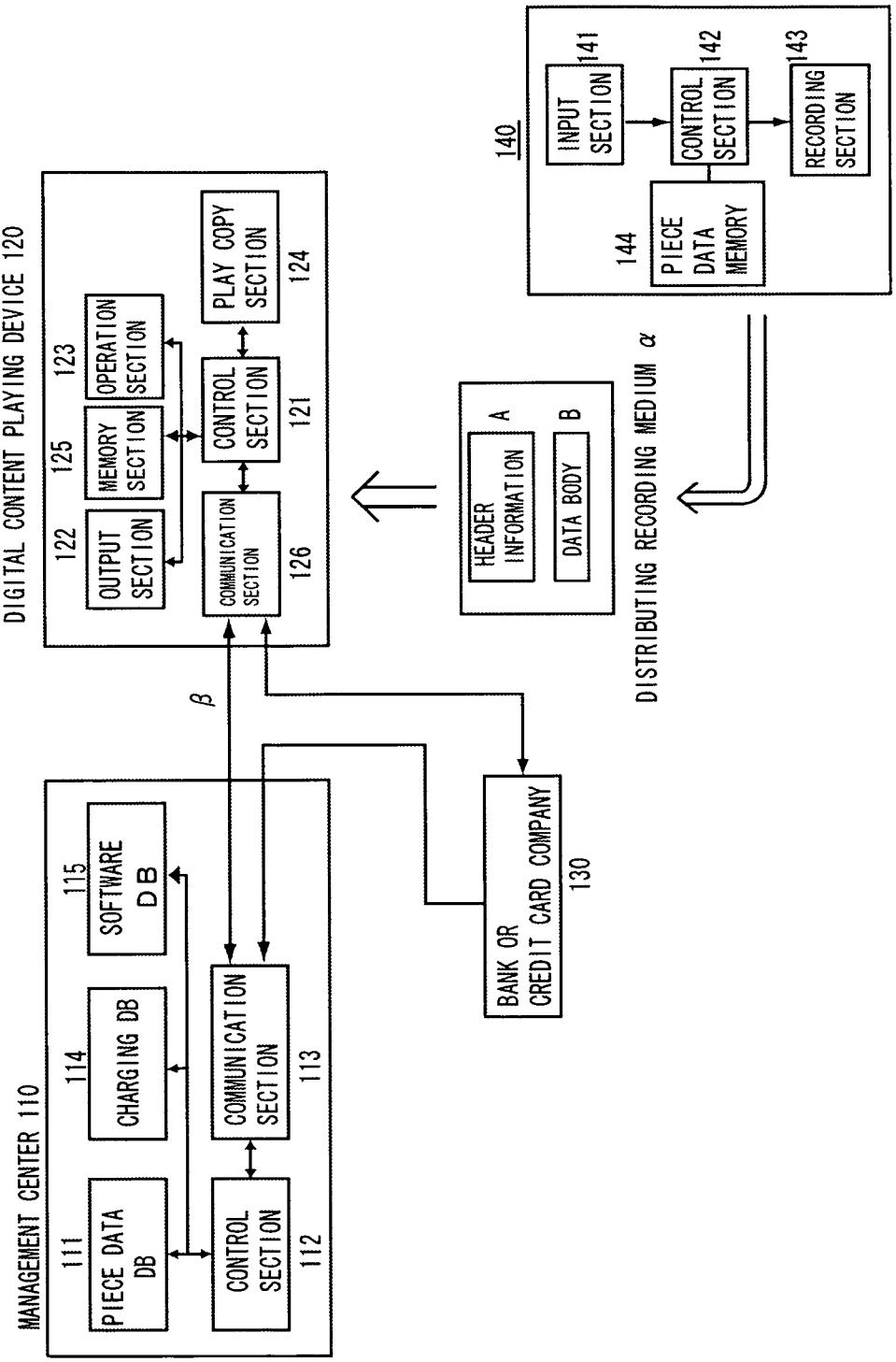
FIG. 1 is a diagram for explaining a first embodiment of the present disclosure, being a block diagram of a system for preventing unauthorized play of digital content, including a block diagram of a distributing recording medium fabrication device used for the system.

α Distributing recording medium
100, 200 System for preventing unauthorized use of digital content
110, 210 Management center
120, 220 Digital content playing device
140, 240 Distributing recording medium fabrication device
300, 400, 500 System for preventing unauthorized use of digital content
310, 410, 510 Delivery management center
320, 420, 520 Digital content playing device

DETAILED DESCRIPTION

In a system for preventing unauthorized play of digital contents according to various embodiments of the present disclosure, a content file is recorded on a distributing recording medium in a state of lacking part of header information. Unless there is piece data as the part of the header information, the data body of the content file cannot be played. Unless play operation is authorized, the data body of the content file cannot be played. Therefore, it is possible to prevent unauthorized use of digital content and to reliably collect a charge for secondary use. The advantage to be originally obtained by such as a content holder can be secured. In this point, the distribution of digital content can be promoted.

In a distributing recording medium fabrication device according to various embodiments of the present disclosure, part of header information is separated as piece data from a content file for recording on a recording medium, thereby creating a distributing recording medium. It has the merit of preventing unauthorized use of digital content.

In a digital content playing device and playing software according to various embodiments of the present disclosure, a request to play a content file is transmitted to management means, and only upon reception of the piece data transmitted from the management means, the data body of the content file is played. Therefore, unauthorized use of digital content can be prevented.

In a system for preventing unauthorized play of digital contents according to various embodiments of the present disclosure, a content file in a state of lacking part of header information and piece data as the lacked part of the header information are prepared in delivery management means. Unless the piece data is obtained by an authorized play request, a data body of the content file cannot be played. Therefore, it is possible to prevent unauthorized use of digital content and to reliably collect a charge for secondary use. The advantage to be originally obtained by such as a content holder can be secured. In this point, the distribution of digital content can be promoted.

In a digital content playing device and playing software according to various embodiments of the present disclosure, a request to play a content file is transmitted to delivery management means, and only upon reception of the piece data transmitted from the management means, the data body of the content file is played. Therefore, it is possible to prevent unauthorized use of digital content.

In a system for preventing unauthorized play of digital content according to various embodiments of the present disclosure, when a predetermined period is reached from the point of time at which piece data is transmitted from the management means or delivery management means, the transmitted piece data is deleted. Unauthorized secondary use can be prevented.

In a system for preventing unauthorized play of digital content according to various embodiments of the present disclosure, a request to play a content file by a user is made under an authentication and/or charging condition of the user. Therefore, unless authentication and/or charging of the user is completed, the play request cannot be accepted. It is difficult to obtain piece data for an unauthorized purpose.

In a system for preventing unauthorized play of digital content, a digital content playing device used for the system, and playing software used for the system according to various embodiments of the present disclosure, an elapsed period is determined from the point of time at which, aside from piece data, a content file is transmitted from the delivery management means, and when the elapsed period reaches a predetermined period, the transmitted content file is deleted. The data body of the content file can be prevented from being recorded into the digital content playing device of the user beyond a predetermined period. There is the merit of preventing the data body of the content file from being copied for an unauthorized purpose.

Embodiments of the present disclosure will be described below.

Embodiment 1

Figure 2:
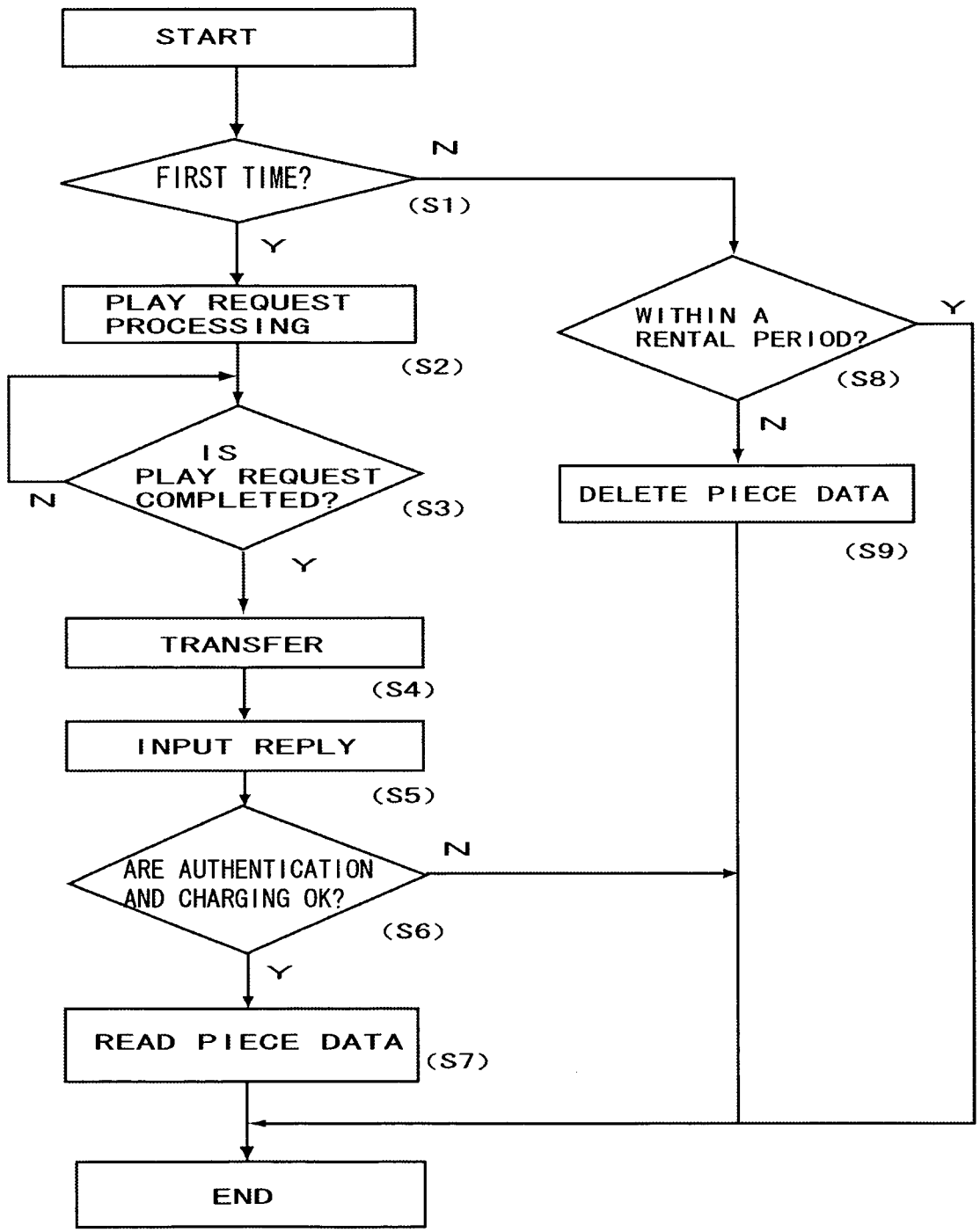
FIG. 2 is a flowchart of playing software used for the system.

A first embodiment of the present disclosure will be described with reference to FIGS. 1 and 2. FIG. 1 is a block diagram of a system for preventing unauthorized play of digital content, including a block diagram of a distributing recording medium fabrication device used for the system. FIG. 2 is a flowchart of playing software used for the system.

A system for preventing unauthorized use of digital content 100 shown in FIG. 1 is a system preventing unauthorized use of a content file on a distributing recording medium α distributed for renting it to a user. Rented is the content file, not the distributing recording medium α itself.

Basically, the system has: a distributing recording medium α which is a recording medium on which a content file having header information "A" and a data body "B" is recorded and lacks part of the header information "A" to prevent unauthorized play and unauthorized copy of the data body "B"; a management center 110 which is management means managing use of the content file on the distributing recording medium α and can deliver the prepared part of the header information "A" as piece data via a communication line β; and a digital content playing device 120 which is a device used for playing and copying the content file on the distributing recording medium α and has the function of communicating via the communication line β with the management center 110. The digital content playing device 120 is a computer here. Playing software processed by the computer is prepared in the management center 110.

The communication line β is an Internet line or a telephone line which is used to perform mutual communication between the management center 110, a bank or credit card company 130 and the digital content playing device 120.

The distributing recording medium α is a general recording medium such as a CD or DVD. The content file on the distributing recording medium α has a data structure having the data body "B" of a user area as the file of such as music, moving image, still image, text, application software or application data, and header information a' (not shown) of a non-user area as content information accompanying the data body "B". Such digital content are recorded in an encrypted form on the distributing recording medium cc including the later-described content ID.

The digital content playing device 120 is a device used for playing and copying the content file on the distributing recording medium α distributed for renting it to the user, as described above. In its function, to play and copy the data body "B" of the content file, unless all of the content of the header information a' are set in a predetermined registry, the data body "B" cannot be, of course, played from the distributing recording medium α and cannot be copied to another distributing recording medium.

The system actively uses the characteristic of the digital content playing device 120, lacks, from the header information a' of the content file, part of data (piece data) included therein (showing the lacked header information a' as the header information a), and includes the header information "A" together with the data body "B" in the content file on the distributing recording medium α, thereby preventing unauthorized play and unauthorized copy of the data body "B"

The piece data is pre-recorded in an encrypted form on a piece data DB 111 of the management center 110. Since the management center 110 manages all uses of many kinds of content files, a content ID showing the kind of the content file is added to the piece data on the piece data DB 111. The content file on the distributing recording medium α includes the same content ID in an encrypted form in an available area in which the piece data of the header information "A" enters.

Using the content IDs, the content file on the distributing recording medium α is matched with the piece data on the piece data DB 111. The management center 110 checks whether the content IDs are matched with each other or not before transferring the piece data to the digital content playing device 120. Therefore, the content IDs are useful for preventing unauthorized use. The content IDs need not be used if one content file is to be managed in the management center 110, aside from the problem of unauthorized use prevention.

The digital content playing device 120 is a general-purpose computer used by the user. In the drawing, the numeral 121 denotes a control section such as a CPU; the numeral 122, an output section such as a monitor or speaker; the numeral 123, an operation section such as a keyboard or mouse; the numeral 124, a play copy section performing read/write of data from/onto the distributing recording medium α; the numeral 125, a memory section such as a hard disk; and the numeral 126, a communication section for performing communication.

Other than the basic program, playing software shown in FIG. 2 is recorded on the memory section 125. The playing software is free software downloaded from the management center 110 via the communication line β and is application software necessary for playing the content file on the distributing recording medium α. A player key allocated to the digital content playing device 120 is also pre-recorded on the memory section 125. The piece data transferred from the management center 110 and the piece data transfer date are further recorded thereon.

The content of the playing software will be described later. The software is processed by the control section 121 so that the computer can exhibit the function as the digital content playing device 120.

The digital content playing device 120 has functions of: when a request to play the content file under authentication and charging conditions is inputted by the user, transferring the request via the communication line β to the management center 110; and thereafter, when piece data is transferred from the management center 110 via the communication line β, using the header information "A" of the content file on the distributing recording medium α and the piece data only in play operation to play the data body "B" of the content file.

The management center 110 is a server operated by a person performing business of renting the data body "B" on the distributing recording medium α to the user under contract with the copyright holder of a publication included in the data body "B" and collecting its rental fee from the user. In the drawing, the numeral 111 denotes a piece data DB on which piece data and a content key necessary for decrypting a content file are pre-recorded in an encrypted form; the numeral 112, a control section such as a computer; the numeral 113, a communication section for performing communication; the numeral 114, a charging DB on which information on authentication and charging of the user is sequentially recorded; and the numeral 115, a software DB on which the playing software is pre-recorded.

The operation of the thus-configured digital content unauthorized use prevention system 100 will be described. Along with it, the content of the playing software and the operation of the management center 110 will be described.

First, the user sets the obtained distributing recording medium α to his/her own computer (computer corresponding to the digital content playing device 120 in a state that the playing software shown in FIG. 2 is not downloaded), and operates the operation section 123 to access the management center 110 via the communication line β for performing necessary user registration. The management center 110 performs user registration according to this and transfers an ID and password of the user via the communication line β to the computer of the user.

Then, the user operates his/her own computer to access the management center 110 and inputs a request to download the playing software to the digital content playing device 120. In this case, the ID and password of the user are necessary. The computer of the user transfers the request via the communication line β to the management center 110. Upon reception of the request, the management center 110 reads the playing software on the software DB 115 and transfers it via the communication line β to the computer of the user. The playing software shown in FIG. 2 is downloaded on the memory section 125 of the computer to be executed.

The digital content playing device 120 decides whether it is the first time that the playing software is executed or not (s1). Immediately after downloading the playing software, it is the first time. Therefore, a predetermined flag is set and the digital content playing device 120 accesses the management center 110 to transfer a message to perform play request processing via the communication line β to the management center 110. The management center 110 transfers data necessary for the play request processing via the communication line β to the digital content playing device 120. The digital content playing device 120 display outputs the play requesting screen on the output section 122 based on the data (s2).

The user sequentially inputs a rental period, a rental money amount and a payment condition (his/her own bank account number or credit card number) via the operation section 123 as indicated on the play requesting screen. Finally, when the ID and password of the user are inputted as a play request of the distributing recording medium cc via the operation section 123 (s3), the digital content playing device 120 switches the displayed output of the output section 122 to the authentication screen and transfers the inputted request data via the communication line β to the management center 110. In this case, the content ID included in the header information "A" on the distributing recording medium α and the player key on the memory section 125 are read and transferred to the management center 110 together with the request (s4).

The management center 110 checks authentication and charging of the user related to the request. That is, it refers to the transferred player key of the user to check whether the user related to the request is a person corresponding to a prepared inadequate persons list or not. It also refers to the transferred bank account number, credit card number or the like of the user to access a bank or credit card company 130, and requests the bank or credit card company 130 via the communication line β to pay a money amount corresponding to the rental fee of the content file on the distributing recording medium α to the company of the management center 110.

When the management center 110 confirms that the user related to the request is a person corresponding to the inadequate persons list, and when a reply indicating that payment is not possible is transferred via the communication line β from the bank or credit card company 130, in either case, it transfers a message to deny the request of the user via the communication line β to the digital content playing device 120.

On the other hand, when the management center 110 confirms that the user related to the request is a person not corresponding to the inadequate persons list and a payment completion reply is transferred from the bank or credit card company 130 via the communication line β, it records the information on the player key of the user and the like and the information on collected charge on the charging DB 114, searches the piece data DB 111 to read the piece data and the content key corresponding to the content ID, and transfers them as a reply to approve the request of the user via the communication line β to the digital content playing device 120.

As for payment of the rental fee of the user to the management center 110, the user may directly request the bank or credit card company 130 to pay it using the digital content playing device 120 via the communication line β, or transfer it into the account of the company of the management center 110 without using the communication line β. In these cases, as for checking charging to the user, the management center 110 checks whether payment of the user is completed, not whether payment can be made from the bank or credit card company 130.

When the message to deny the request of the user is transferred from the management center 110 via the communication line β (s5), the digital content playing device 120 display outputs on the output section 122 a message that the authentication and charging conditions of the user are not met (s6) to end the processing of the software.

On the other hand, when the piece data and content key are transferred as the reply to approve the request of the user from the management center 110 via the communication line β(a5), the authentication and charging conditions of the user are met (s6) to record the piece data and content key on the memory section 125. At the sane time, the clock function of the computer is used to record the piece data transfer date on the memory section 125. The header information "A" on the distributing recording medium α and the piece data on the memory section 125 and the like are used only in play operation to play the data body "B" on the distributing recording medium α (s7). When such setting is ended, the processing of the program is ended.

When the digital content playing device 120 is play operated by the user, it reads and decrypts the content key on the memory section 125, reads the header information "A" of the content file on the distributing recording medium α to decrypt it using the content key, and reads the piece data on the memory section 125 to decrypt it using the content key. When the content information is registered into a predetermined registry, the data body "B" of the content file on the distributing recording medium α is decrypted and played using the content key.

Thus, the digital content playing device 120 plays the data body "B" of the content file on the distributing recording medium α as operated. On the other hand, when the user sets another distributing recording medium to the digital content playing device 120 for copy operation, the digital content playing device 120 copies the content file on the distributing recording medium α as it is to another distributing recording medium. Since this cannot include the piece data, new distributing recording medium α is only created.

Therefore, when the user operates the digital content playing device 120 to execute the playing software, it is decided whether it is the first time that the playing software is executed or not is decided (s1). Since it is not immediately after downloading the playing software and the flag is set, the piece data transfer date on the memory section 125 is read to decide whether the current date is within the rental period or not. That is, the difference between the piece data transfer date and the current date is determined as an elapsed period from the point of time at which the piece data is transferred. When the elapsed period reaches the rental period included in the rental information, it is decided that it is not within the rental period, and when it has not reached the rental period, it is decided that it is within the rental period (s8).

As the result of the decision, when it is not within the rental period, the message is display outputted on the output section 122 to delete the piece data and the content key on the memory section 125 (s9) for ending the processing of the software. When it is within the rental period, the processing of the software is directly ended. In this case, in quite the same manner as the case immediately after downloading the playing software, the digital content playing device 120 plays the data body "B" of the content file on the distributing recording medium α as operated. When the user sets another distributing recording medium to the digital content playing device 120 for copy operation, new distributing recording medium α is only created.

In the system, when the user uses the digital content playing device 120 for play operation, unless authentication and payment of the rental fee to the management center 110 are completed, the data body "B" of the content file on the distributing recording medium α cannot be played. The case of using a general digital content playing device instead of the digital content playing device 120 is alike. Primary, secondary and tertiary unauthorized uses of the content file on the distributing recording medium α can thus be prevented.

When using the digital content playing device 120 to play the content file on the distributing recording medium α not within the rental period, the piece data and the like on the memory section 125 is only deleted automatically at this point and the content file on the distributing recording medium α remains the same. Within the rental period, the digital content playing device 120 can be used to create a new distributing recording medium α by copying the content file. To play the content file on the distributing recording medium cc, the digital content playing device 120 can be used to reliably collect charges for secondary and tertiary uses since authentication and payment of the rental fee to the management center 110 are necessary.

A distributing recording medium fabrication device 140 used for creating the distributing recording medium α will be described here with reference to FIGS. 1 and 3.

The distributing recording medium fabrication device 140 is a device used by the company of the management center 110 or a person related to this, and separates piece data from a content file having the header information a' and the data body "B" for recording, and records the content file separated from the piece data on a set recording medium to create the distributing recording medium α. Here, a computer is used.

Figure 3:
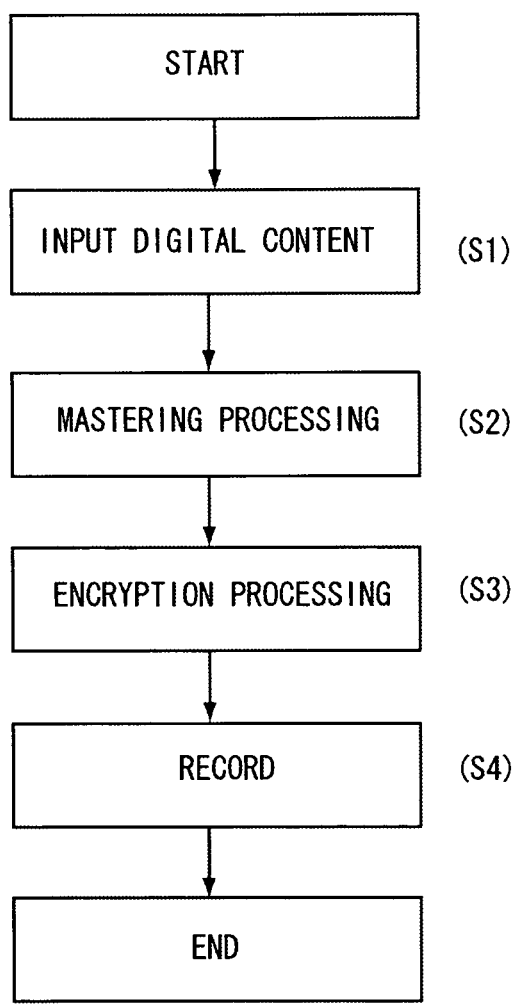
FIG. 3 is a flowchart of recording medium creating software executed by a computer as the distributing recording medium fabrication device used for the system.

In FIG. 1, the numeral 141 denotes an input section playing a recording medium such as a DVD on which digital content obtained from the content holder are recorded; the numeral 142, a control section such as a CPU processing the recording medium creating software shown in FIG. 3; the numeral 143, a recording section which can set a recording medium such as a CD or DVD and records a content file on the recording medium; and the numeral 144, a piece data memory recording piece data separated from the content file.

The content of the recording medium creating software shown in FIG. 3, and the operation of the distributing recording medium fabrication device 140 will be described.

A recording medium such as a DVD is set to the recording section 143 of the distributing recording medium fabrication device 140. A DVD or the like on which digital content are recorded is set to the input section 141. In this state, the recording medium creating software is executed.

First, the digital content recorded on the set DVD are read by the input section 141 (s1). Piece data is separated from a header part a' included in the digital content, and the separated piece data is encrypted to be recorded on the piece data memory 144 (s2). Then, the digital content separated from the piece data is encrypted (s3), and the encrypted digital content are recorded on a recording medium such as a DVD set to the recording section 143 (s4). The software is ended. The distributing recording medium α is created.

The first embodiment can be design changed to a system preventing unauthorized use of the content file on the distributing recording medium α transferred to the user for pay or for free, not rented. In this case, it has the same merit as above. The playing software used in this case may only delete a series of processing according to whether it is within or not within the rental period. The digital content playing device, without downloading the playing software from the management center 110, may download it via a recording medium such as a CD. As a matter of course, it may be an exclusive device, not a computer. The digital content playing device has functions of: when a request to play a content file under authentication and charging conditions is inputted by the user, transferring the request via the communication line β to the management center 110; and thereafter, when piece data is transferred from the management center 110 via the communication line β, using the header information on the distributing recording medium α and the piece data only in play operation to play the data body "B" on the distributing recording medium α. The digital content playing device which has such function may be of any configuration.

Embodiment 2

Figure 4:
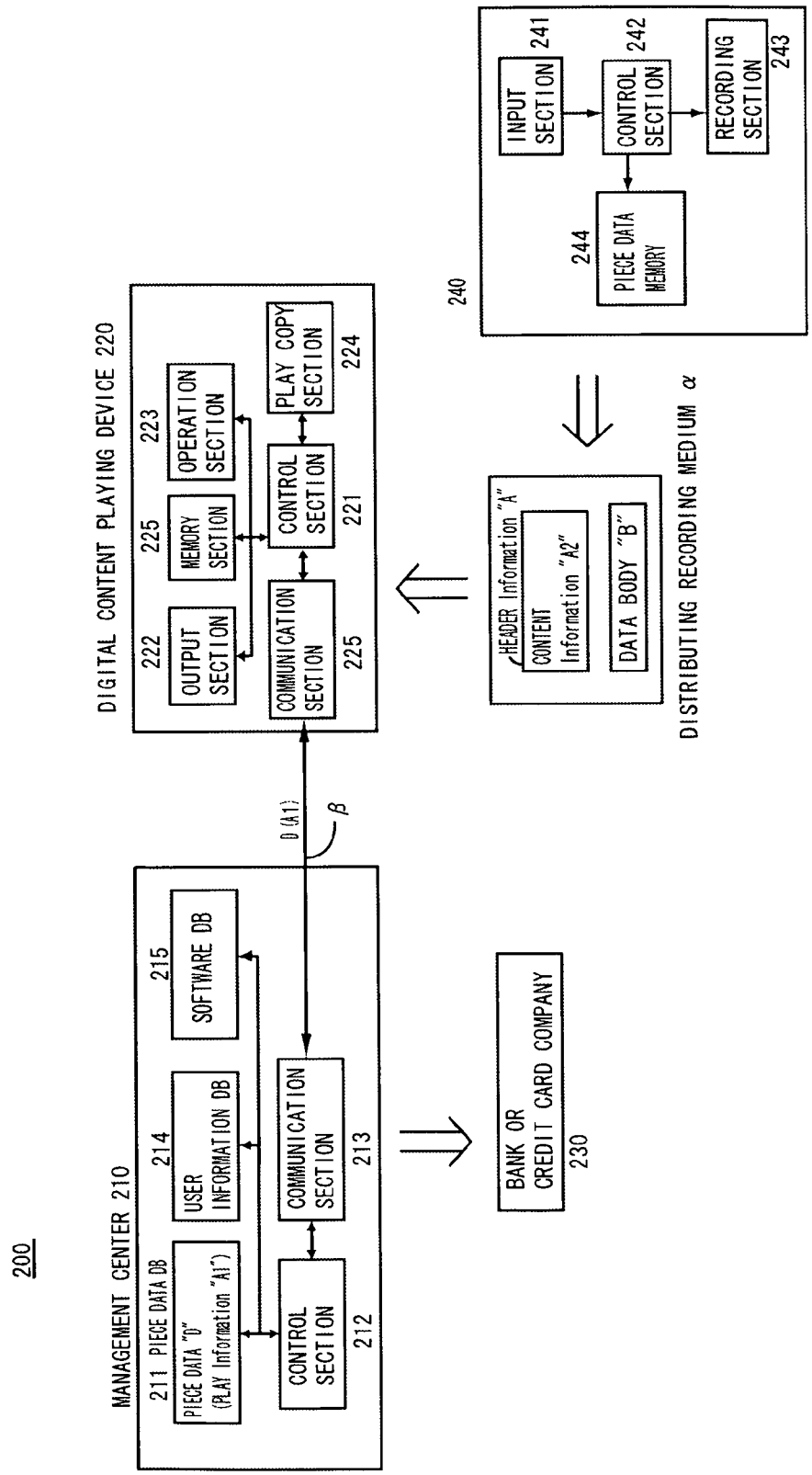
FIG. 4 is a diagram for explaining a second embodiment of the present disclosure, being a block diagram of a system for preventing unauthorized play of digital content, including a block diagram of a distributing recording medium fabrication device used for the system.
Figure 5:
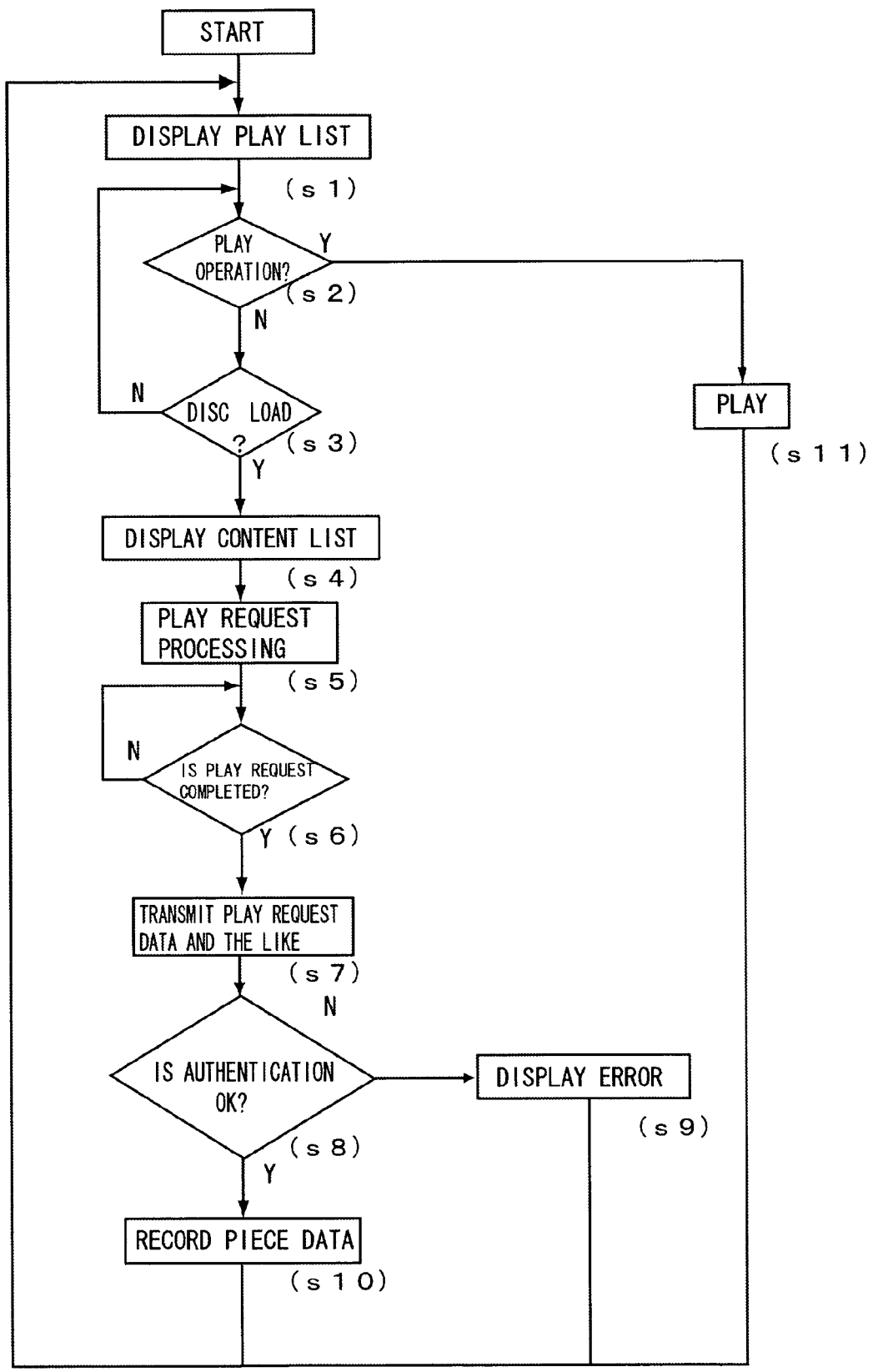
FIG. 5 is a flowchart of playing software used for the system.

A second embodiment of the present disclosure will be described with reference to FIGS. 4 and 5. FIG. 4 is a block diagram of a system for preventing unauthorized play of digital content, including a block diagram of a distributing recording medium fabrication device used for the system. FIG. 5 is a flowchart of playing software used for the system.

A system for preventing unauthorized use of digital content 200 shown in FIG. 4 is a system preventing unauthorized use of a content file on distributing recording medium α distributed for renting it to a user. Rented is the content file, not the distributing recording medium α itself.

Basically, the system has: a distributing recording medium α on which a content file having header information "A" and a data body "B" is recorded in a state of lacking part of the header information "A" (that is, play information "A1" indispensable for playing the data body "B" included in the header information a); a management center 210 which is management means managing use of the content file on the distributing recording medium a and can deliver the prepared lacked play information "A1" included in the header information "A" as piece data via a communication line β; and a digital content playing device 220 which is a device used for playing and copying the content file on the distributing recording medium α and has a function of communicating via the communication line β with the management center 210. The digital content playing device 220 is a computer here. Playing software processed by the computer is prepared in the management center 210.

The communication line β is a digital line such as an optical communication line or an analog line such as a telephone line. This is used to perform mutual communication between the management center 210 and the digital content playing device 220.

The distributing recording medium α is a general recording medium such as a CD or DVD. The content file on the distributing recording medium α has a data structure having the data body "B" as data of music, moving image, still image, text, game or software, and content information "A2" such as information on the WEB address of the management center 210 in which a content ID allocated to the data body "B" and piece data "D" are stored. The play information "A1" included in the header information "A" is lacked from the content file having the header information "A" (the play information "A1" and the content information "A2" and the data body "B" for encryption. The play information "A1" refers to data showing the address value of a sector to be read of the data body "B", the size of the data body "B" and the like.

The digital content playing device 220 is a general-purpose computer used by the user. In the drawing, the numeral 221 denotes a control section such as a CPU; the numeral 222, an output section such as a monitor or speaker; the numeral 223, an operation section such as a keyboard or mouse; the numeral 224, a play copy section performing read/write of data from/onto the distributing recording medium cc; the numeral 225, a memory section such as a hard disk; and the numeral 226, a communication section for performing communication.

Other than the basic program, playing software shown in FIG. 5 is recorded on the memory section 225. The playing software is software for pay or for free downloaded from the management center 210 via the communication line β under a user registration condition and is application software necessary for playing the content file on the distributing recording medium α. A player ID allocated to the playing software is also transmitted to the memory section 225 together with the playing software from the management center 210 to be recorded. Further, the piece data "D", the decryption key and the like transmitted from the management center 210 are recorded on the memory section 225, and the piece data transmission date and the rental information showing the rental period are recorded thereon.

The content of the playing software will be described later. The software is processed by the control section 221 so that the computer can exhibit the function as the digital content playing device 220.

That is, the digital content playing device 220 has functions of: when a request to play the content file under an authentication condition is inputted by the user, transmitting the request via the communication line β to the management center 210; and thereafter, when piece data "D" is transmitted from the management center 210 via the communication line β, using the header information "A" of the content file on the distributing recording medium α and the piece data "D" in play operation to play the data body "B" of the content file, and functions of: determining an elapsed period from the point of time at which the piece data "D" is transmitted from the management center 210, and when the elapsed period reaches a predetermined period, deleting the transmitted piece data.

The management center 210 is a server operated by a person performing business of renting the data body "B" on the distributing recording medium α to the user under contract with the copyright holder of a publication included in the data body "B" and collecting its rental fee from the user. In the drawing, the numeral 211 denotes a piece data DB on which encrypted piece data "D" and a decryption key necessary for decrypting the piece data "D" and a content file are recorded; the numeral 212, a control section such as a computer; the numeral 213, a communication section for performing communication; the numeral 214, a user information DB on which user information is recorded and information on authentication and charging based on this is sequentially recorded; and the numeral 215, a software DB on which the playing software is pre-recorded.

A content ID showing the corresponding content file is added to the piece data "D" on the piece data DB 211. The content IDs are used to match the content file on the distributing recording medium α with the piece data d on the piece data DB 211. The user ID and player ID of the corresponding user are added to the user information on the user information DB. The user ID or player ID is used for matching with the user information of each user on the user information DB. The management center 210 checks (that is, authenticates) the user ID and password before transmitting the piece data "D" to the digital content playing device 220, and also checks whether the content IDs are matched with each other or not. The content IDs are useful to prevent unauthorized use.

The operation of the thus-configured system for preventing unauthorized use of digital content 200, and the content of the playing software and the operation of the management center 210 will be described.

First, the user operates the operation section 223 of his/her own computer (computer corresponding to the digital content playing device 220 in a state that the playing software shown in FIG. 5 is not downloaded) to access the management center 210 via the communication line β for performing user registration (specifically, registering his/her name and address, and a payment condition "his/her own bank account number or credit card number"). The management center 210 creates a user ID and password according to this, registers the user information to the user information DB 214, and transmits the user ID and password via the communication line β to the computer of the user. The user may input the user ID and password at user registration.

Then, the user operates his/her own computer to access the management center 210 and inputs a request to download the playing software. In this case, the user ID and password are necessary. The computer of the user transmits the request via the communication line β to the management center 210. Upon reception of the request, the management center 210 reads the playing software on the software DB 215 and transmits it via the communication line β to the computer of the user. The playing software shown in FIG. 5 is downloaded on the memory section 225 of the computer to be installed. Thus, the computer becomes the digital content playing device 220.

The digital content playing device 220 to which the distributing recording medium is set by the user display outputs the playing software on the output section 222 when the playing software is executed. A play list showing rented content is displayed on the screen of the playing software (s1). That is, the content file in which a predetermined flag showing that play is requested is set, is displayed on the play list. Based on the play list, whether play operation is performed via the operation section 223 or not is decided (s2).

When it is decided that the play operation is not performed, whether a distributing recording medium α read operation (DISC LOAD operation) is performed via the operation section 223 or not is decided (s3). When the DISC LOAD operation is performed, a content list showing content files not play requested is display outputted on the output section 222 (s4). That is, content files in which a predetermined flag is not set are displayed on the content list.

Therefore, when the user makes a request to play the content file on the content list, the management center 210 is accessed to read content information "A2" included in the header information "A" of the content file on the distributing recording medium α for transmitting the content ID via the communication line β to the management center 210 based on the WEB address included in the content information "A2". Thus, a message to perform play request processing is transmitted. The management center 210 transmits data necessary for the play request processing via the communication line β to the digital content playing device 220, which display outputs the play requesting screen on the output section 222 based on the data (s5).

The user sequentially inputs or selects a rental period (by which a rental fee amount is determined) via the operation section 223 as indicated on the play requesting screen. Finally, when the user ID and password are inputted as a play request of the distributing recording medium α via the operation section 223 (s6), the digital content playing device 220 switches the displayed output of the output section 222 to the authentication screen and transmits the inputted request data via the communication line β to the management center 210. In this case, the content ID of the content information "A2" on the distributing recording medium α and the player ID on the memory section 225 are read and transmitted to the management center 210 together with the request data (s7).

The management center 210 checks authentication of the user related to the request. That is, it refers to the transmitted user ID and player ID of the user, and reads the user information of the user from the user information DB 214 to check whether the user is an authorized user or not. The management center 210 having prepared an inadequate persons list of persons having over predetermined nonpayment of rental fee on the user information DB 214, checks whether the user is a person corresponding to the inadequate persons list or not together with the authentication (The check of the inadequate persons list is arbitrary.).

When the management center 210 confirms that the user related to the request is an unauthorized user or a person corresponding to the inadequate persons list although he/she is an authorized user, it transmits a message to deny the request of the user via the communication line β to the digital content playing device 220.

On the other hand, when the management center 210 confirms that the user related to the request is an authorized user and a person not corresponding to the inadequate persons list, it refers to the player ID and the like of the user to record a charge in the user information on the user information DB 214 of the user, searches the piece data DB 211 to read the piece data "D" and the decryption key corresponding to the content ID, and transmits them as a reply to approve the request of the user via the communication line β to the digital content playing device 220.

For charging, based on the user information DB 214 for each predetermined period, the rental fee is charged to a bank or credit card company 230 or is charged directly to the user to let him/her transfer it into an account or pay it at a convenience store or the like. When the management center 210 has been still connected via the communication line β to the bank or credit card company 230, immediate payment can be, of course, made.

The digital content playing device 220, when the message to deny the request of the user is transmitted from the management center 210 via the communication line β (s8), display outputs an error message on the output section 222 (s9).

On the other hand, when the piece data "D" and the decryption key are transmitted as the reply to approve the request of the user from the management center 210 via the communication line β (a8), a predetermined flag is set, and the piece data "D" and the decryption key are recorded on the memory section 225 (s10). At the same time, the clock function of the computer is used to record the piece data transmission date on the memory section 225. The play list is display outputted on the output section 222 (s1).

Therefore, the digital content playing device 220, reads the decryption key from the memory section 225 to decrypt the piece data "D" when the content file is play operated via the operation section 223 based on the play list (s2). Based on the piece data "D", the data body d is read from the memory section 225 to read another decryption key from the memory section 225 to decrypt and play the data body d (s11). The program of the playing software is ended by performing ending processing by the user.

The playing software has the above basic function and a piece data management function resident in the digital content playing device 220 of managing the piece data "D" when the power of the digital content playing device 220 is turned on. By the piece data management function, the piece data "D" on the memory section 225 is managed, and the difference between the piece data transmission date and the current date is determined as an elapsed period from the point of time at which the piece data "D" is transmitted. When this reaches the rental period included in the rental information, it is decided that it is not within the rental period to delete the piece data "D" and the decryption key on the memory section 225 to unset a predetermined flag.

In the system, when the user uses the digital content playing device 220 for play operating the distributing recording medium cc, unless the piece data "D" is obtained as an authorized play requester from the management center 210, the data body "B" of the content file on the distributing recording medium α cannot be played. This can prevent temporal unauthorized use of the content file on the distributing recording medium cc. The piece data "D" of the content file whose rental period has elapsed is deleted to prevent secondary unauthorized use. When the distributing recording medium α is copied to another distributing recording medium by the user, the play information "A1" included in the header information "A" is lacked from the content file recorded on another distributing recording medium. Therefore, unless the piece data "D" is obtained as an authorized play requester, it cannot be played. Thus, tertiary unauthorized use can be also prevented.

Not within the rental period of the distributing recording medium cc, the piece data and the like on the memory section 225 is only deleted automatically. The content file on the distributing recording medium α remains the same. Within the rental period, the digital content playing device 220 can be used to create a new distributing recording medium α by copying the content file. To play the content file on the distributing recording medium cc, the digital content playing device 220 can be used to reliably collect charges for secondary and tertiary uses since authentication and payment of the rental fee to the management center 210 are necessary.

Aside from the distributing recording medium cc, a charge for the data body d of the content file is collected in play request. Therefore, the distributing recording medium α is distributed for free, and after that, charging can be performed to the play requester. Alternatively, the distributing recording medium α is sold at a price related to this, and after that, charging can be performed to the play requester. When the content of the content file recorded on the distributing recording medium α include a technical book such as a medical book, the content of the technical book such as a medical book are divided into items to record each of the items as a content file on the distributing recording medium α for requesting to play each of the items. An expensive technical book can be provided at home to play request (rent) each of the items for reference as necessary. The system is used to respond to various new business forms.

When a plurality of content files are recorded on the distributing recording medium α, the user can rent only the content file which he/she desires to view or listen to. A person creating the distributing recording medium α can create distributing recording medium α on which an arbitrary content file is recorded without consideration of the taste of the user and trend. Therefore, the cost for creating the distributing recording medium cc can be reduced.

Figure 6:
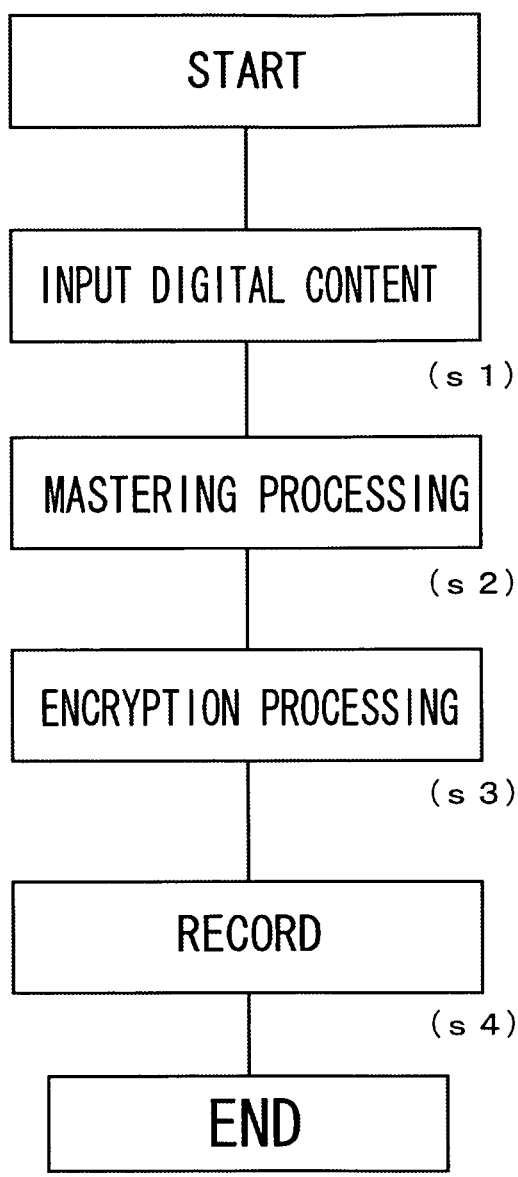
FIG. 6 is a flowchart of recording medium creating software executed by a computer as the distributing recording medium fabrication device used for the system.

A distributing recording medium fabrication device 240 used for creating the distributing recording medium α will be described here with reference to FIGS. 4 and 6. FIG. 6 is a flowchart of recording medium creating software executed by a computer as a distributing recording medium fabrication device used for the system.

The distributing recording medium fabrication device 240 is a device used by the company of the management center 210 or a person related to this, and separates play information "A1" included in header information "A" as piece data "D" from a content file having the header information "A" and data body "B" for recording and records the content file separated from the piece data "D" on a set recording medium to create the distributing recording medium cc. Here, a computer is used.

In FIG. 4, the numeral 241 denotes an input section reading digital content from a master disc; the numeral 242, a control section such as a CPU processing the recording medium creating software shown in FIG. 6; the numeral 243, a recording section which can set a recording medium such as a CD or DVD and records a content file on the recording medium; and the numeral 244, a piece data memory recording piece data "D" separated from the content file.

The content of the recording medium creating software shown in FIG. 6, and the operation of the distributing recording medium fabrication device 240 will be described.

When the distributing recording medium fabrication device 240 is turned on, it executes the recording medium creating software. A master disc is manually or automatically set to the input section 241. A recording medium such as a DVD is automatically sequentially set to the recording section 243.

First, a content file is read from the set master disc by the input section 241 (s1). Play information "A1" included in header information "A" is separated as piece data "D" from the header information "A" included in the content file, and the separated piece data "D" is encrypted to be recorded on the piece data memory 244 (s2). Then, the content file is encrypted (s3), and is recorded on a recording medium such as a DVD set to the recording section 243 (s4). The software is ended. The piece data "D" recorded on the piece data memory 244 is recorded on the recording medium to be transmitted to the management center 210. The distributing recording medium α is thus created.

The system for preventing unauthorized play of digital content 200 has: a distributing recording medium which is a recording medium on which a content file having header information and a data body is recorded and lacks part of the header information to prevent unauthorized play of the data body; management means which is means managing use of the content file on the distributing recording medium and can transmit the prepared part of the header information as piece data via a communication line; and a digital content playing device which is a device used for at least playing the content file on the distributing recording medium and has the function of communicating via the communication line with the management means, wherein when a request to play the content file under an authentication condition is inputted by a user to the digital content playing device, the digital content playing device transmits the request via the communication line to the management means, the management means checks authentication of the user related to the request to transmit the piece data via the communication line to the digital content playing device, and the digital content playing device uses the header information on the distributing recording medium and the piece data in play operation to play the data body on the distributing recording medium. Any design change can be made to the system for preventing unauthorized play of digital content 200 of such configuration.

As for the distributing recording medium cc, the content file having the header information "A" and the data body "B" is recorded in a state of lacking the play information "A1" included in the header information a. It can be, of course, recorded in a state of adding other information. As for other information, there is a program or the like which decides whether the playing software is installed on the computer of the user or not, and when deciding that it is not installed, automatically accesses the HP of the management center 210. When the program is recorded and the user sets the obtained distributing recording medium α to his/her own computer (computer corresponding to the digital content playing device 220 in a state that the playing software is not downloaded), the WEB address of the management center 210 is read to access the management center 210 based on this. Therefore, when obtaining the playing software by the above procedure, the content file on the distributing recording medium α can be played.

The content of the playing software are only an example. Changing timing at which user registration and user authentication are performed and changing the content or the like is arbitrary.

The second embodiment can be design changed to a system preventing unauthorized use of the content file on the distributing recording medium α transferred to the user for pay or for free, not rented. In this case, it has the same merit as above. The playing software used in this case may only delete a series of processing according to whether it is within or not within the rental period. The digital content playing device, without downloading the playing software from the management center 210, may install it via the recording medium such as a CD. As a matter of course, it may be an exclusive device, not a computer. The digital content playing device has functions of: when a request to play a content file under authentication and charging conditions is inputted by the user, transmitting the request via the communication line β to the management center 210; and thereafter, when the piece data "D" is transmitted from the management center 210 via the communication line β, using the header information on the distributing recording medium α and the piece data "D" only in play operation to play the data body "B" on the distributing recording medium α. The digital content playing device which has such function may be of any configuration.

Embodiment 3

Figure 7:
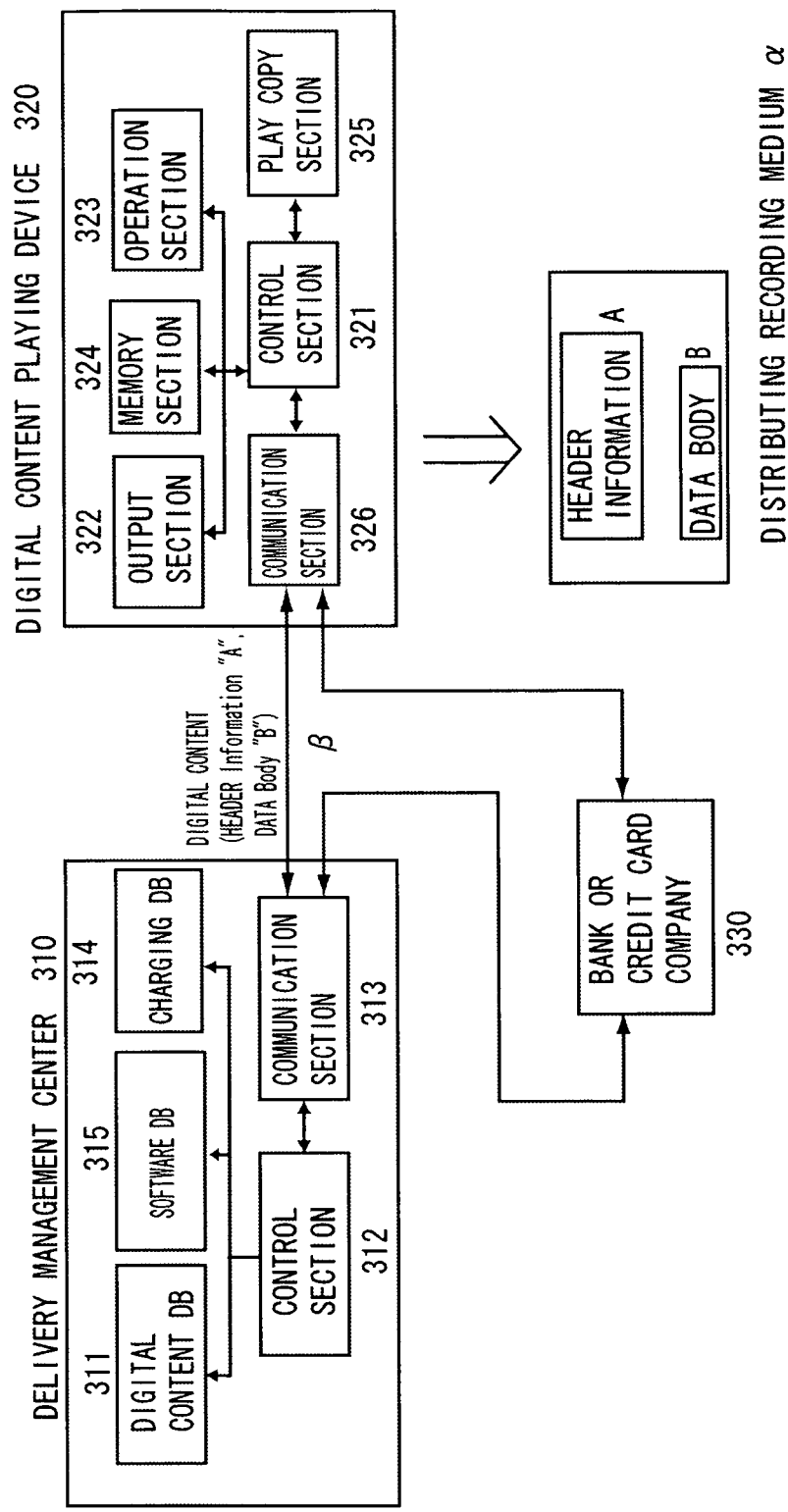
FIG. 7 is a block diagram of the system for preventing unauthorized play of digital content.
Figure 8:
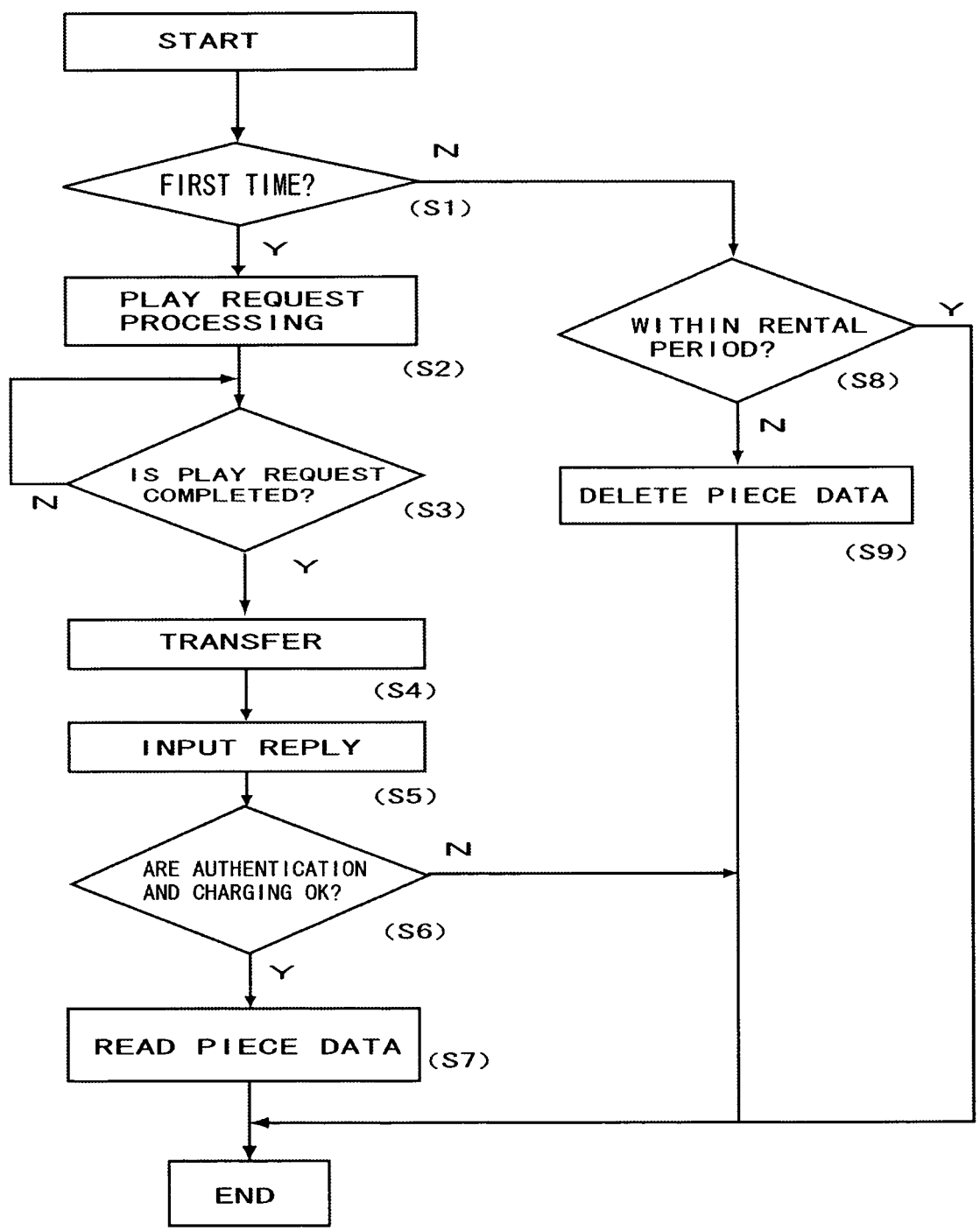
FIG. 8 is a flowchart of playing software used for the system.

A third embodiment of the present disclosure will be described with reference to FIGS. 7 and 8. FIG. 7 is a block diagram of a system for preventing unauthorized play of digital content. FIG. 8 is a flowchart of playing software used for the system.

A system for preventing unauthorized use of digital content 300 shown in FIG. 7 is a system preventing unauthorized use of a content file delivered for renting it to a user.

The system has a delivery management center 310 as delivery management means delivering a content file having header information "A" and a data body "B" via a communication line β and managing use of the data body "B" of the content file; and a digital content playing device 320 communicable via the communication line β with the delivery management center 310 and used for playing and copying the content file delivered from the delivery management center 310. The digital content playing device 320 is a computer here. Playing software processed by the computer is prepared in the delivery management center 310.

The communication line β is an Internet line or a telephone line and performs mutual communication between the delivery management center 310, a bank or credit card company 330 and the digital content playing device 320.

The content file here has a data structure having the data body "B" of a user area as the file of such as music, moving image, still image, text, application software or application data, and header information a' (not shown) of a non-user area as content information accompanying the data body "B". Such content file is pre-recorded in an encrypted form on a digital content DB 311 of the delivery management center 310.

The digital content playing device 320 is a device used for playing and copying the content file delivered for renting it to the user, as described above. In its function, to play and copy the data body "B" of the content file, unless all of the content of the header information a' are set in a predetermined registry, the data body "B" cannot be, of course, played from the distributing recording medium α and cannot be copied to another distributing recording medium.

The system actively uses the function of the digital content playing device 320, lacks, from the header information a' of the content file, part of data (piece data) included therein (showing the lacked header information a' as the header information a), and includes the header information "A" together with the data body "B" in the content file of the distributing recording medium cc, thereby preventing unauthorized play and unauthorized copy of the data body "B".

The content file having the header information "A" and the data body "B" is pre-recorded in an encrypted form on the digital content DB 311 of the delivery management center 310. The piece data, the content key and the like are also pre-recorded in an encrypted form on the digital content DB 311.

The digital content playing device 320 is a general-purpose computer used by the user. In the drawing, the numeral 321 denotes a control section such as a CPU; the numeral 322, an output section such as a monitor or speaker; the numeral 323, an operation section such as a keyboard or mouse; the numeral 324, a play copy section performing read/write of data from/onto the distributing recording medium α and the like; the numeral 324, a memory section such as a hard disk; and the numeral 326, a communication section for performing communication.

Other than the basic program, playing software shown in FIG. 8 is recorded on the memory section 324. The playing software is free software downloaded from the delivery management center 310 via the communication line β and is application software necessary for playing the content file. Piece data, a content key and the like transferred from the delivery management center 310 are recorded and the piece data transfer date is recorded thereon.

The content of the playing software will be described later. The software is processed by the control section 321 so that the computer can exhibit the function as the digital content playing device 320.

The digital content playing device 320 has functions of: when a request to download the digital content is inputted by the user, transferring the request via the communication line β to the delivery management center 310; after the content file is transferred from the delivery management center 310, when a request to play the content file under authentication and charging conditions is inputted by the user, transferring the request via the communication line β to the delivery management center 310; and thereafter, when the piece data is transferred from the delivery management center 310 via the communication line β, using the header information "A" of the transferred content file and the piece data only in play operation to play the data body "B" of the content file.

The delivery management center 310 is a server operated by a person performing business of renting the content file to the user under contract with the copyright holder of a publication included in the data body "B" of the content file to be delivered and collecting its rental fee from the user. In the drawing, the numeral 311 denotes a digital content DB on which a content file to be delivered is pre-recorded in an encrypted form together with a content ID; the numeral 312, a control section such as a computer; the numeral 313, a communication section for performing communication; the numeral 314, a charging DB on which information such as authentication and charging of the user is sequentially recorded; and the numeral 315, a software DB on which the playing software is pre-recorded.

The operation of the thus-configured system for preventing unauthorized use of digital content 300, and the content of the playing software will be described.

First, the user operates the operation section 323 of his/her own computer (computer corresponding to the digital content playing device 320 in a state that the playing software shown in FIG. 8 is not downloaded), and accesses the delivery management center 310 via the communication line for performing necessary user registration. The delivery management center 310 performs user registration according to this and transfers the ID and password of the user via the communication line β to the computer of the user.

Then, the user operates his/her own computer to access the delivery management center 310 and inputs a request to download the playing software to the digital content playing device 320. In this case, the ID and password of the user are necessary. The computer of the user transfers the request via the communication line β to the delivery management center 310. Upon reception of the request, the delivery management center 310 reads the playing software on the software DB 315 and transfers it via the communication line β to the computer of the user. The playing software shown in FIG. 8 is downloaded on the memory section 324 of the computer to be executed.

First, the digital content playing device 320 decides whether it is the first time that the playing software is executed or not (s1). Since immediately after downloading the playing software, it is the first time, a predetermined flag is set and the digital content playing device 320 accesses the delivery management center 310 to transfer a message to perform play request processing via the communication line β to the delivery management center 310. The delivery management center 310 transfers data necessary for the play request processing via the communication line β to the digital content playing device 320. The digital content playing device 320 display outputs the play requesting screen on the output section 322 based on the data (s2).

The user sequentially inputs a rental period, a rental money amount and a payment condition (his/her own bank account number or credit card number) via the operation section 323 as indicated on the play requesting screen. Finally, when the ID and password of the user are inputted as a play request of the distributing recording medium cc via the operation section 323 (s3), the digital content playing device 320 switches the displayed output of the output section 322 to the authentication screen and transfers the inputted request data via the communication line β to the delivery management center 310.

The management center 110 checks authentication and charging of the user related to the request. That is, it refers to the transferred user ID or the like of the user to check whether the user related to the request is a person corresponding to a prepared inadequate persons list or not. It also refers to the transferred bank account number, credit card number or the like of the user to access the bank or credit card company 330 to request the bank or credit card company 330 via the communication line β to pay a money amount corresponding to the rental fee of the content file to the company of the delivery management center 310.

When the delivery management center 310 confirms that the user related to the request is a person corresponding to the inadequate persons list, and when a reply indicating that payment is not possible is transferred via the communication line β from the bank or credit card company 330, in either case, it transfers a message to deny the request of the user via the communication line β to the digital content playing device 320.

When confirming that the user related to the request is not a person corresponding to the inadequate persons list and when a payment completion reply from the bank or credit card company 330 is transmitted via the communication line β, the information on the user ID of the user and the information on collected charge are recorded on the charging DB 314, the digital content DB 311 is searched to read the content file on the digital content DB 311. While the piece data is lacked to prevent unauthorized play and unauthorized copy, the piece data and the player key are transferred via the communication line β to the digital content playing device 320.

On the other hand, the digital content are transferred from the delivery management center 310 via the communication line β as a reply to approve the request of the user (a5), the authentication and charging conditions of the user are met (s6) to record the content file and the like on the memory section 324. At the same time, the clock function of the computer is used to record the piece data transfer date on the memory section 324. The header information "A" of the content file, the piece data and the like are used only in play operation to play the data body "B" of the content file (s7). When such setting is ended, the processing of the program is ended.

When the digital content playing device 320 is play operated by the user, it reads and decrypts the content key on the memory section 324, reads the header information "A" of the content file to decrypt it using the content key, and reads the piece data on the memory section 324 to decrypt it using the content key. When the header information and the piece data are registered into the predetermined registry, the data body "B" of the content file is decrypted and played using the content key.

Thus, the digital content playing device 320 plays the data body "B" of the content file as operated. On the other hand, when the user sets a distributing recording medium to the digital content playing device 320 for copy operation, the digital content playing device 320 copies the content file as it is to the distributing recording medium to only create distributing recording medium cc.

When the user operates the digital content playing device 320 to execute the playing software, whether it is the first time that the playing software is executed or not is decided (s1). Since it is not immediately after downloading the playing software and the flag is set, the piece data transfer date on the memory section 324 is read to decide whether the current date is within the rental period or not. The difference between the piece data transfer date and the current date is determined as an elapsed period from the point of time at which the piece data is transferred. When it has reached the rental period included in the rental information, it is decided that it is not within the rental period. When it has not reached the rental period, it is decided that it is within the rental period (s8).

After the decision, when it is not within the rental period, the message is display outputted on the output section 322 to delete the piece data and the content key on the memory section 324 (s9) to end the processing of the software. When it is within the rental period, the processing of the software is directly ended. In this case, in quite the same manner as the case immediately after downloading the playing software, the digital content playing device 320 plays the data body "B" of the content file as operated. When the user sets a distributing recording medium to the digital content playing device 320 for copy operation, a new distributing recording medium α is only created.

In the system, when the user uses the digital content playing device 320 for play operation, unless authentication and payment of the rental fee to the delivery management center 210 are completed, the data body "B" of the content file cannot be played. The case of playing the distributing recording medium α created by the digital content playing device 320 by another computer is alike. Not only primary, but also secondary and tertiary unauthorized uses of the content file can be prevented.

When using and playing the digital content playing device 320 not within the rental period of the digital content, the piece data and the like on the memory section 324 is automatically deleted at this point and the content file remains the same. Within the rental period, the digital content playing device 320 can be used to create the distributing recording medium α. To play the content file on the distributing recording medium cc, the digital content playing device 320 can be used to reliably collect charges for secondary and tertiary uses since authentication and payment of the rental fee to the delivery management center 310 are necessary.

The third embodiment can be design changed to a system preventing unauthorized use of the content file delivered for pay or for free, not rented. In this case, it has the same merit as above. The playing software used in this case may only delete processing when the delivered content file is not within the rental period. The digital content playing device 320, without downloading the playing software from the delivery management center 310, may download it via a recording medium such as a CD. As a matter of course, it may be an exclusive device, not a computer.

Embodiment 4

Figure 9:
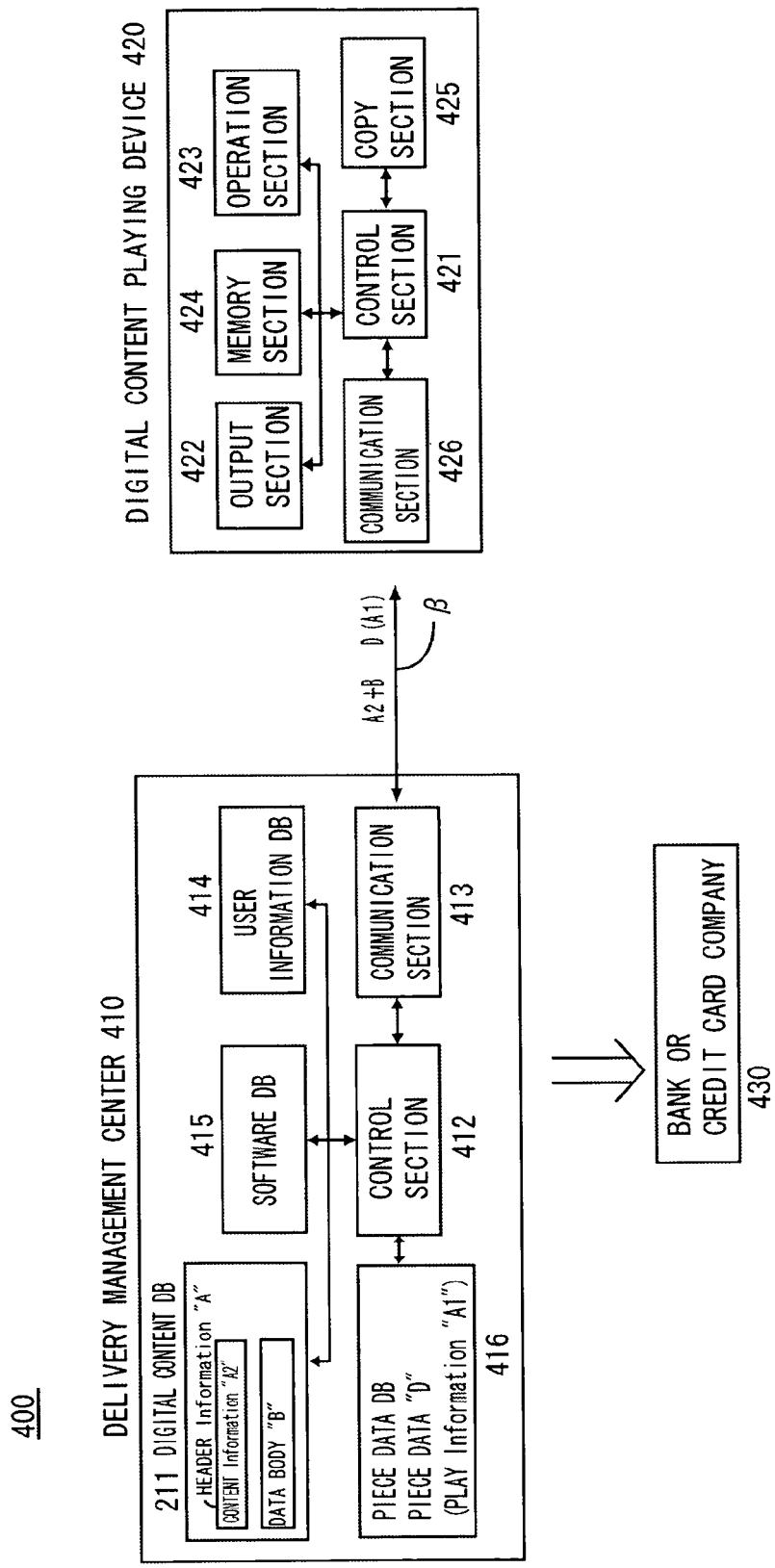
FIG. 9 is a block diagram of the system for preventing unauthorized play of digital content.
Figure 10:
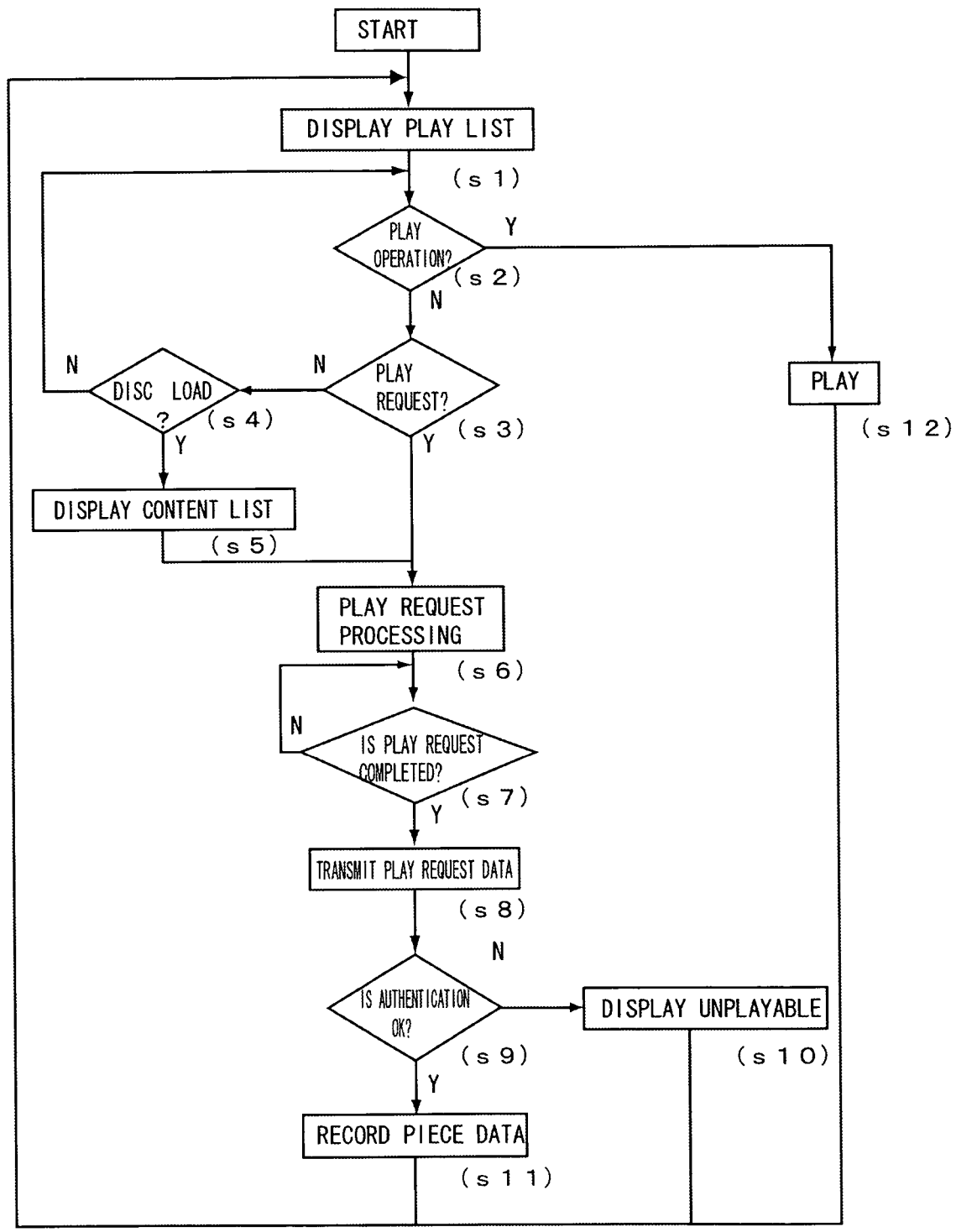
FIG. 10 is a flowchart of playing software used for the system.

A fourth embodiment of the present disclosure will be described with reference to FIGS. 9 and 10. FIG. 9 is a block diagram of a system for preventing unauthorized play of digital content. FIG. 10 is a flowchart of playing software used for the system.

A system for preventing unauthorized use of digital content 400 shown in FIG. 9 is a system preventing unauthorized use of a content file delivered for renting it to a user.

The system has: a delivery management center 410 which is a server in which a content file having header information "A" and a data body "B" is prepared in a state of lacking part of the header information "A" (that is, play information "A2" included in the header information a) and the lacked play information "A2", aside from the content file, is prepared as piece data "D" and is delivery management means delivering the content file via a communication line and managing use of the data body "B"; and a digital content playing device 420 communicable via the communication line β with the delivery management center 410 and used for playing and copying the content file delivered from the delivery management center 410. The digital content playing device 420 is a computer here. Playing software processed by the computer is prepared in the delivery management center 410.

The content file here has a data structure having the data body "B" as data of such as music, moving image, still image, text, game or software, and the content information "A2" such as information on the WEB address of the management center 110 in which a content ID allocated to the data body "B" and piece data "D" are stored. The play information "A1" included in the header information "A" is lacked from the content file having the header information "A" (the play information "A1" and the content information "A2") and the data body "B" for encryption. The play information "A1" refers to data showing the address value of a sector to be read of the data body "B", the size of the data body "B" and the like.

The digital content playing device 420 is a general-purpose computer used by the user. In the drawing, the numeral 421 denotes a control section such as a CPU; the numeral 422, an output section such as a monitor or speaker; the numeral 423, an operation section such as a keyboard or mouse; the numeral 424, a play copy section performing read/write of data from/onto the distributing recording medium α or the like; the numeral 424, a memory section such as a hard disk; and the numeral 426, a communication section for performing communication.

Other than the basic program, playing software shown in FIG. 10 is recorded on the memory section 424. The playing software is software for pay or for free downloaded from the delivery management center 410 via the communication line β under a user registration condition and is application software necessary for playing the content file. Information on the WEB address of the delivery management center 410 in which a player ID allocated to the playing software and the piece data "D" are stored is transmitted to the memory section 424 together with the playing software from the delivery management center 410 to be recorded. Further, the piece data "D", the decryption key and the like transmitted from the delivery management center 410 are recorded on the memory section 424 and the piece data transfer date and the rental information showing the rental period are recorded thereon.

The content of the playing software will be described later. The playing software shown in FIG. 10 is processed by the control section 421 so that the computer can exhibit the function as the digital content playing device 420.

That is, the digital content playing device 420 has functions of: when a request to download the content file is inputted by the user, transmitting the request via the communication line β to the delivery management center 410; after the content file is transmitted from the delivery management center 410, when a request to play the content file under an authentication condition is inputted by the user, transmitting the request via the communication line β to the delivery management center 410; and thereafter, when the piece data "D" is transmitted from the delivery management center 410 via the communication line β, using the header information "A" of the transmitted content file and the piece data "D" in play operation to play the data body "B" of the content file, and functions of: determining an elapsed period from the point of time at which the piece data "D" is transmitted from the delivery management center 410; and when the elapsed period reaches a predetermined period, deleting the transmitted piece data.

The delivery management center 410 is a server operated by a person performing business of renting the content file to the user under contract with the copyright holder of a publication included in the data body "B" of the content file to be delivered and collecting its rental fee from the user. In the drawing, the numeral 411 denotes a digital content DB on which a content file to be delivered is pre-recorded in an encrypted form together with a content ID; the numeral 412, a control section such as a computer; the numeral 413, a communication section for performing communication; the numeral 414, a user information DB on which user information is recorded and information on authentication and charging and the like based on this is sequentially recorded; the numeral 415, a software DB on which the playing software is pre-recorded; and the numeral 416, a piece data DB on which piece data "D" and a decryption key necessary for decrypting the piece data "D" and the content file are pre-recorded in an encrypted form together with the content ID.

The operation of the thus-configured system for preventing unauthorized use of digital content 400, and the content of the playing software will be described.

First, the user operates the operation section 423 of his/her own computer (computer corresponding to the digital content playing device 420 in a state that the playing software is not downloaded) to access the delivery management center 410 via the communication line β for performing necessary user registration as in Embodiment 1. The delivery management center 410 creates a user ID and password according to this, registers the user information into the user information DB 414, and transmits the user ID and password via the communication line β to the computer of the user. The user may input the user ID and password at user registration.

Then, the user operates his/her own computer to access the delivery management center 410 and inputs a request to download the playing software. In this case, the user ID and password are necessary. The computer of the user transmits the request via the communication line β to the delivery management center 410. Upon reception of the request, the delivery management center 410 reads the playing software on the software DB 415 and transmits it via the communication line to the computer of the user. The playing software is downloaded on the memory section 424 of the computer to be installed. The computer becomes the digital content playing device 420.

When obtaining the content file, the digital content playing device 420 accesses the delivery management center 410 according to the operation via the operation section 423 of the user. The delivery management center 410 transmits data of the content files list to the digital content playing device 420. The digital content playing device 420 display outputs the content files list on the output section 422 based on the data. The delivery management center 410 may be accessed based on the WEB address recorded together with the playing software after executing the software, or may be accessed based on the WEB address registered by the user into the Internet browser.

The user selects the content file to be rented from the content files list via the operation section 423. Data of the request of the selected content file is transmitted to the delivery management center 410.

When the delivery management center 410 receives the data of the request, it refers to a content ID included in this to search for and read the content file corresponding to the content ID from the digital content DB 411 and transmits it to the digital content playing device 420. When the digital content playing device 420 receives the content file, it records it on the registry of the memory section 424 or a recording medium set to the copy section 425.

Thereafter, when the playing software is executed by the user (When the content file is recorded on a recording medium, the playing software is executed and the recording medium is set.), the digital content playing device 420 display outputs the playing software on the output section 422. The content information "A2" of the content file recorded on the memory section 424 is read, and the content file is displayed on the play list on the screen of the playing software (s1). The play list displays the file name of the content file and the message that the content file is rented. Thus, it displays a message that the content file, in which a predetermined flag showing that play is requested is set, is rented. Based on the play list, whether the rented content file is play operated via the operation section 423 or not is decided (s2).

When it is decided that the play operation is not performed, whether a play request operation of the unrented content file displayed on the play list is performed via the operation section 423 or not is decided (s3). When it is decided that the play request operation is not performed, whether a recording medium read operation (LOAD operation) is performed via the operation section 423 or not is decided (s4). When the LOAD operation is performed, the content list showing content files not play requested is display outputted on the output section 422 (s5) That is, content files on the recording medium in which a predetermined flag is not set are displayed on the content list.

When the user makes a request to play the content file on the play list or the content list, the content information "A2" included in the header information "A" of the content file on the memory section 424 or the recording medium is read to transmit the content ID via the communication line β to the delivery management center 410 based on the WEB address included in the content information "A2". In this way, a message to perform play request processing is transmitted. The delivery management center 410 transmits data necessary for the play request processing via the communication line β to the digital content playing device 420. The digital content playing device 420 display outputs the play requesting screen on the output section 422 based on the data (s6).

Thereafter, the user sequentially inputs or selects a rental period (by which a rental fee amount is automatically determined) via the operation section 423 as indicated on the play requesting screen. Finally, when the user ID and password are inputted as a play request of the content file via the operation section 423 (s7), the digital content playing device 420 switches the displayed output of the output section 422 to the authentication screen and transmits the inputted request data via the communication line β to the delivery management center 410. In this case, the content ID of the content information "A2" on the memory section 424 or the recording medium and the player ID on the memory section 424 are read and transmitted to the delivery management center 410 together with the request data (s8).

Then, the delivery management center 410 checks authentication of the user related to the request. That is, it refers to the transmitted user, player ID and the like of the user, and reads the user information of the user from the user information DB 414 to check whether the user is an authorized user or not. The delivery management center 410 prepares an inadequate persons list indicating persons having over predetermined nonpayment of rental fee in the user information DB 414 and checks whether the user is a person corresponding to the inadequate persons list together with the authentication (The check of the inadequate persons list is arbitrary.).

When the delivery management center 410 confirms that the user related to the request is an unauthorized user or a person corresponding to the inadequate persons list although he/she is an authorized user, a message to deny the request of the user is transmitted via the communication line β to the digital content playing device 420.

On the other hand, when the delivery management center 410 confirms that the user related to the request is an authorized user and a person not corresponding to the inadequate persons list, it refers to the player ID or the like of the user to record a charge in the user information on the user information DB 414 of the user, searches the piece data DB 416 to read the piece data "D" and the decryption key corresponding to the content ID, and transmits them as a reply to approve the request of the user via the communication line β to the digital content playing device 420.

For charging, based on the user information DB 414 for each predetermined period, the rental fee is charged to a bank or credit card company 430 or is charged directly to the user to let him/her transfer it into an account or pay it at a convenience store or the like. When the delivery management center 410 has been still connected via the communication line β to the bank or credit card company 430, immediate payment can be, of course, made.

Thereafter, the digital content playing device 420, when the message to deny the request of the user is transmitted from the delivery management center 410 via the communication line β (s9), display outputs an error message on the output section 422 (s10).

When the piece data "D" and the decryption key are transmitted as the reply to approve the request of the user from the delivery management center 410 via the communication line β(a9), a predetermined flag is set, and the piece data "D" and the decryption key are recorded on the memory section 424 (s11). At the same time, the clock function of the computer is used to record the piece data transmission date on the memory section 424. The play list is display outputted on the output section 422 (s1).

Thereafter, the digital content playing device 420, when the content file is play operated via the operation section 423 based on the play list (s2), reads the decryption key from the memory section 424 to decrypt the piece data "D". Based on the piece data "D", the data body d is read to read another decryption key from the memory section 424 to decrypt and play the data body d (s12). The program of the playing software is ended by performing ending processing by the user.

The playing software has the above basic function and a piece data management function resident in the digital content playing device 420 of managing the piece data "D" when the power of the digital content playing device 420 is turned on. By the piece data management function, the piece data "D" on the memory section 424 is managed, and the difference between the piece data transmission date and the current date is determined as an elapsed period from the point of time at which the piece data "D" is transmitted. When this reaches the rental period included in the rental information, it is decided that it is not within the rental period to delete the piece data "D" and the decryption key on the memory section 424 to unset a predetermined flag.

In the unauthorized play prevention system 400, when the user uses the digital content playing device 420 for play operating the content file, unless the piece data "D" is obtained as an authorized play requester from the delivery management center 410, the data body "B" of the content file cannot be played. This can prevent temporal unauthorized use of the content file. The piece data "D" of the content file whose rental period has elapsed is deleted to prevent secondary unauthorized use. When the content file is copied to another recording medium by the user, the play information "A1" included in the header information "A" is lacked from the content file recorded on the recording medium. Therefore, unless the piece data "D" is obtained as an authorized play requester, it cannot be played. Tertiary unauthorized use can be also prevented.

Not within the rental period of the digital content, the piece data "D" on the memory section 424 is only automatically deleted, and the content file remains the same. Within or not within the rental period, the digital content playing device 420 can be used to copy the content file to another recording medium. To play the content file on the recording medium, the digital content playing device 420 can be used to reliably collect charges for secondary and tertiary uses since authentication and payment of the rental fee to the delivery management center 410 are necessary.

In the system, as described above, the computer having a write function is used to easily record the content file on the recording medium. Instead of displaying a recording medium such as a video tape, CD or DVD, a rental video shop can be provided with the computer. In this manner, the recording medium need not be returned. There is a merit for both the shop and customer. Since what content file is downloaded cannot be recognized by the shop clerk, the customer can easily rent digital content depending on its type. In this case, a form of a rental video shop need not be taken. Needless to say, it is possible to provide the service of an Internet cafe. The content DB may be provided at a rental video shop or Internet cafe.

The unauthorized play prevention system 400 has: delivery management means which is a server in which a content file having header information and a data body is prepared in a state of lacking part of the header information and the part of the header information is prepared as piece data and delivers the content file via a communication line and manages use of the data body; and a digital content playing device capable of communicating via the communication line with the delivery management means and used for at least playing the content file delivered from the delivery management means, wherein when a request to download the content file is inputted by a user to the digital content playing device, the digital content playing device transmits the request via the communication line to the delivery management means, the delivery management means transmits the content file related to the request via the communication line to the digital content playing device, thereafter, when a request to play the content file under an authentication condition is inputted by the user to the digital content playing device, the digital content playing device transmits the request via the communication line to the delivery management means, the delivery management means checks authentication of the user related to the request to transmit the piece data of the content file related to the request via the communication line to the digital content playing device, and the digital content playing device uses the header information of the transmitted content file and the piece data in play operation to play the data body of the content file. Any design change can be made to the unauthorized play prevention system 400 of such configuration.

The delivery management center 410 has one digital content DB 411, but may have more. In this case, for example, a movie content file may be stored in a first DB and a music content file may be stored in a second DB. That is, different kinds of content files may be stored in DBs. The content files stored in the DBs may be the same to prevent access to the first DB from being concentrated at congestion. The same thing applies to the piece data DB 416. The delivery management center 410 has the digital content DB 411 and the piece data DB 416. The digital content DB 411 and the piece data DB 416 may be installed in locations different from the delivery management center 410. In this case, the delivery management center 410 authenticates the user to transmit the WEB address of the digital content DB 411 and the piece data DB 416 to the digital content playing device 420. The digital content playing device 420 may access the digital content DB 411 and the piece data DB 416 based on the WEB address to obtain the content file and piece data "D".

As for the digital content DB 411, the content file having the header information "A" and the data body "B" is recorded in a state of lacking the play information "A1" included in the header information a. It can be, of course, recorded in a state of adding other information. As for other information, there is a program or the like which decides whether the playing software is installed on the computer of the user or not, and when deciding that it is not installed, automatically accesses the HP of the delivery management center 410. When the program is recorded and the user executes the obtained content file on his/her own computer (computer corresponding to the digital content playing device 420 in a state that the playing software is not downloaded), the WEB address of the delivery management center 410 is read to automatically access the delivery management center 410 based on this. When obtaining the playing software by the above procedure, the content file on the memory section 424 can be played.

The content of the playing software are only an example. Changing timing at which user registration and user authentication are performed and changing the content or the like is arbitrary. When the content file is recorded on the memory section 424 of the digital content playing device 420 and the rental period has elapsed, the content file may be deleted together with the piece data "D". Aside from the piece data "D", an elapsed period from the point of time at which the content file is received may be determined, and when the elapsed period reaches a predetermined period, the content file may be deleted.

The fourth embodiment can be design changed to a system preventing unauthorized use of the content file delivered for pay or for free, not rented. In this case, it has the same merit as above. The playing software used in this case may only delete processing when the delivered content file is not within the rental period. The digital content playing device 420, without downloading the playing software from the delivery management center 410, may download it via a recording medium such as a CD. As a matter of course, it may be an exclusive device, not a computer.

Embodiment 5

Figure 11:
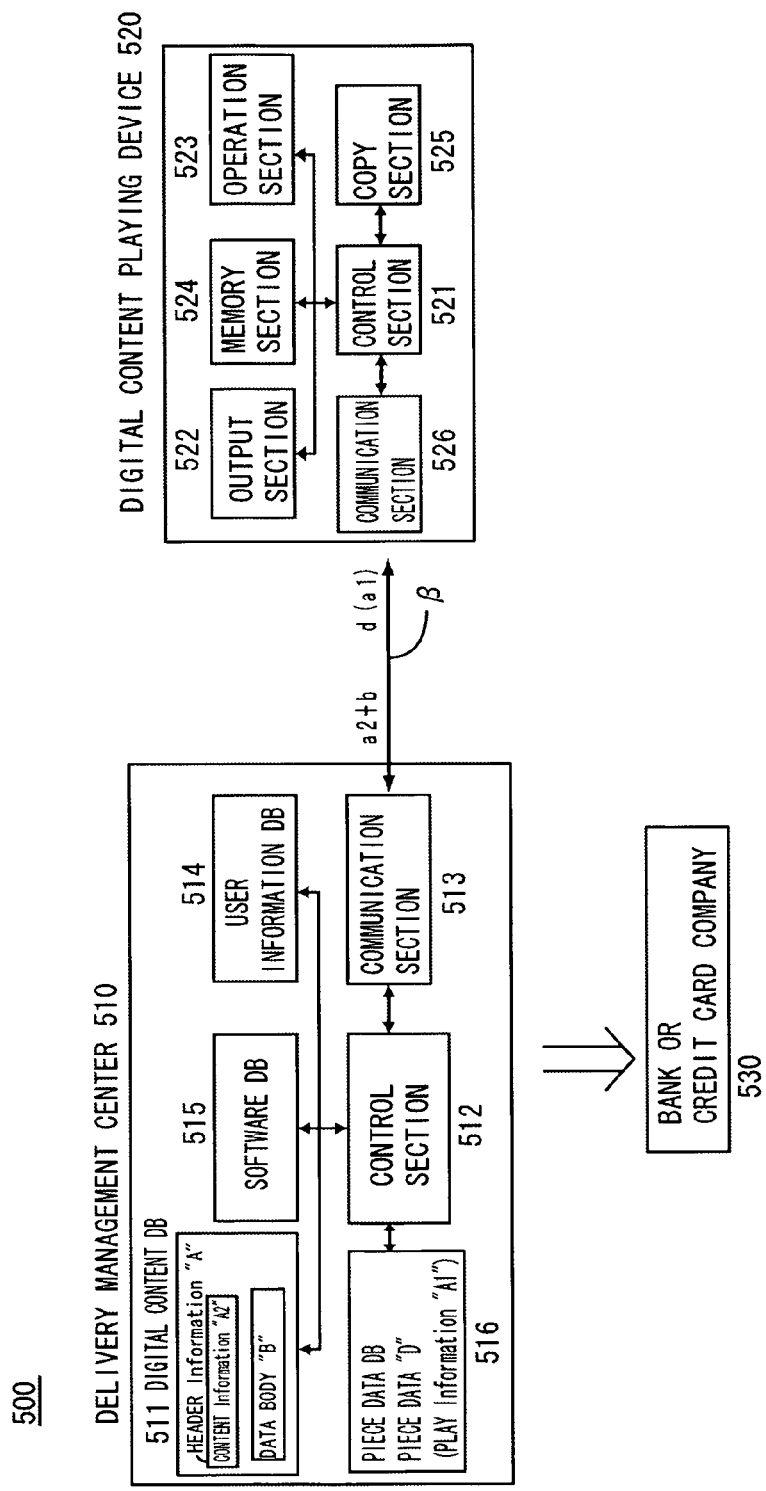
FIG. 11 is a block diagram of the system for preventing unauthorized play of digital content.
Figure 12:
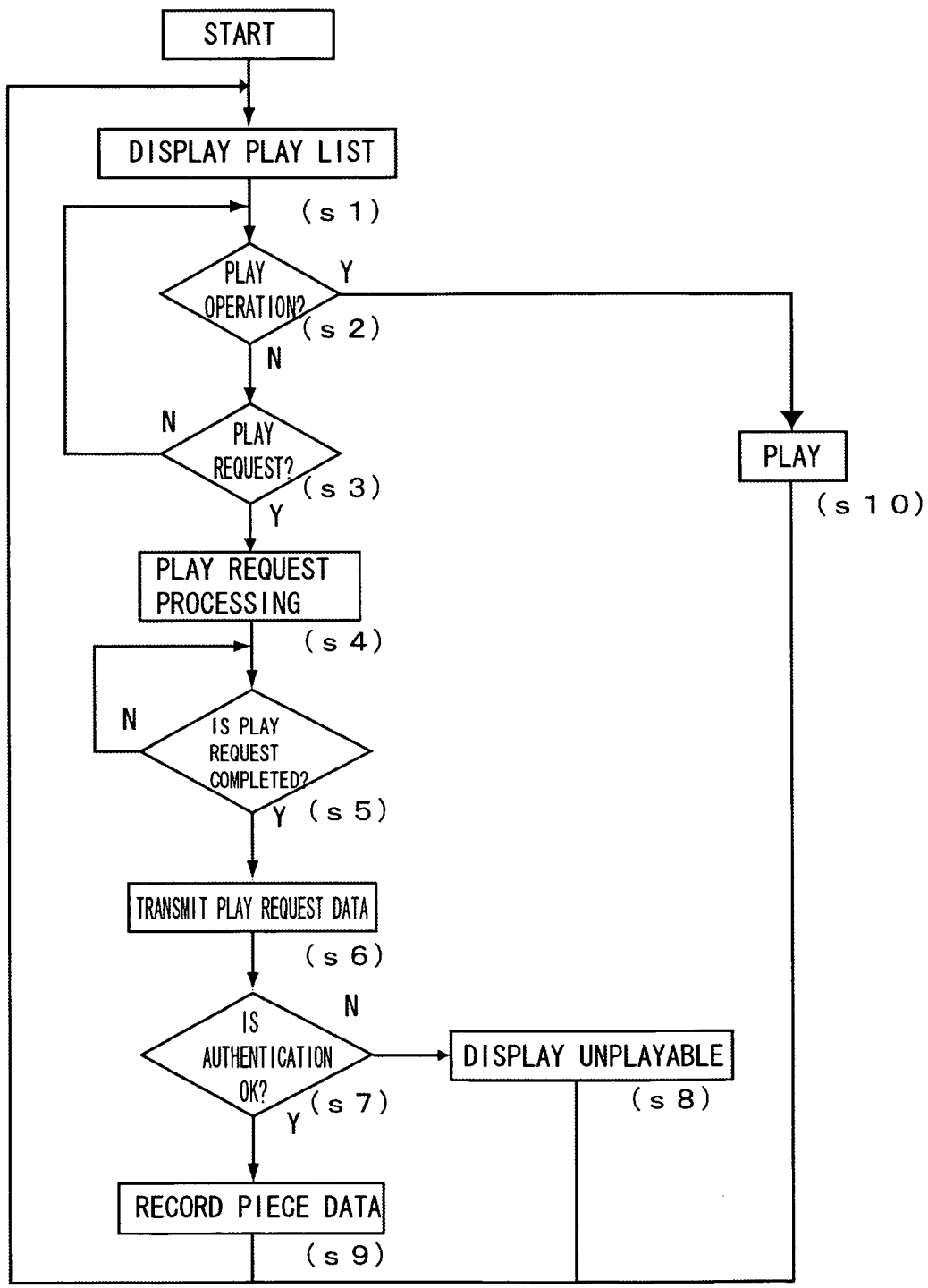
FIG. 12 is a flowchart of playing software used for the system.
Figure 4:
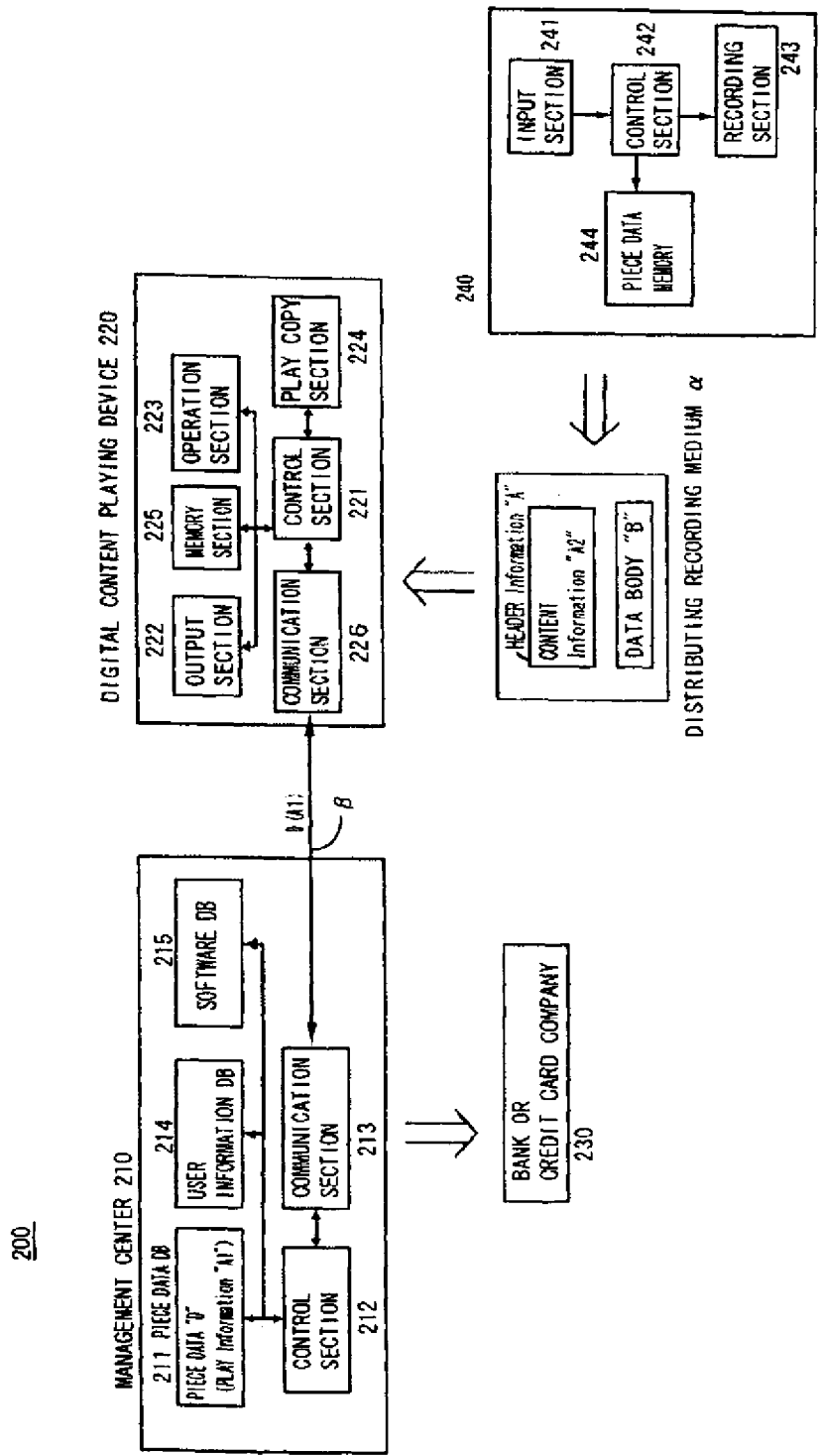
Figure 9:
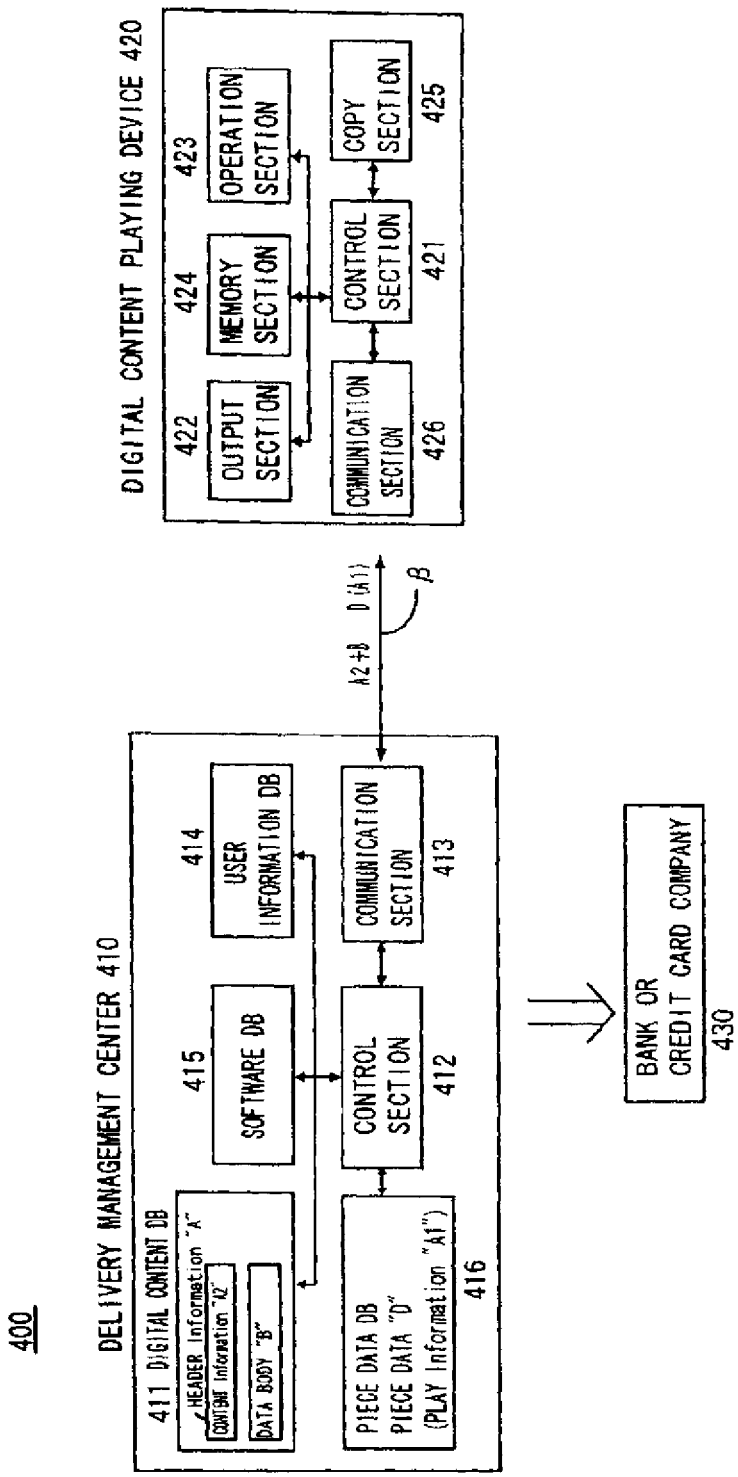

A third embodiment of the present disclosure will be described with reference to FIGS. 11 and 12. FIG. 11 is a block diagram of a system for preventing unauthorized play of digital content. FIG. 12 is a flowchart of playing software used for the system for preventing unauthorized use of digital content.

A system for preventing unauthorized use of digital content 500 shown in FIG. 11 has the same configuration as that of the unauthorized use prevention system 400 except that the content of the playing software processed by a control section 512 of a digital content playing device 520 are different. The content of the playing software shown in FIG. 12 will be described below in detail and the description of the overlapped parts is omitted.

The playing software is recorded on a memory section 524 of the digital content playing device 520 by the same procedure as that of Embodiment 4.

When obtaining the content file, the digital content playing device 520 accesses a delivery management center 510 according to the operation via an operation section 523 of the user. The delivery management center 510 transmits data necessary for rental request processing via the communication line β to the digital content playing device 220. The digital content playing device 220 display outputs the rental requesting screen on the output section 222 based on the data.

Therefore, the user sequentially inputs or selects a rental period (by which a rental fee amount is automatically determined) via the operation section 523 as indicated on the rental requesting screen. Finally, when the user ID and password are inputted as a rental request of the content file via the operation section 523, the digital content playing device 520 switches the displayed output of the output section 522 to the authentication screen and transmits the inputted request data via the communication line β to the delivery management center 510. In this case, the player ID on the memory section 524 is read and transmitted to the delivery management center 210 together with the request data.

The delivery management center 510 then checks authentication of the user related to the request. That is, it refers to the transmitted user ID, player ID and the like of the user, and reads the user information of the user from the user information DB 514 to check whether the user is an authorized user or not. The delivery management center 510 prepares an inadequate persons list indicating persons having over predetermined nonpayment of rental fee in the user information DB 514 and checks whether the user is a person corresponding to the inadequate persons list or not together with the authentication (The check of the inadequate persons list is arbitrary.).

When the delivery management center 510 confirms that the user related to the request is an unauthorized user or a person corresponding to the inadequate persons list although he/she is an authorized user, a message to deny the request of the user is transmitted via the communication line β to the digital content playing device 520.

On the other hand, when the delivery management center 510 confirms that the user related to the request is an authorized user or a person not corresponding to the inadequate persons list, it refers to the player ID and the like of the user to record a charge in the user information on the user information DB 514 of the user, and transmits the data of the content files list as a reply to approve the request of the user via the communication line β to the digital content playing device 520.

For charging, based on the user information DB 514 for each predetermined period, the rental fee is charged to a bank or credit card company 530 or is charged directly to the user to let him/her transfer it into an account or pay it at a convenience store and the like. When the delivery management center 510 has been still connected via the communication line β to the bank or credit card company 530, immediate payment can be, of course, made.

The digital content playing device 520 display outputs the content files list on the output section 522 based on the data. The delivery management center 510 may be accessed based on the WEB address recorded together with the software after executing the playing software, or may be accessed based on the WEB address registered by the user into the Internet browser.

Thereafter, the user selects the content file to be rented from the content files list via the operation section 523. Data of the request of the selected content file is transmitted to the delivery management center 510.

When the delivery management center 510 receives the data of the request, it refers to a content ID included in this to search for and read the content file corresponding to the content ID from the digital content DB 511 and searches for and reads the piece data "D" and the decryption key corresponding to the content ID from the piece data DB 516 to sequentially transmit the content file, piece data "D" and decryption key to the digital content playing device 520.

When the digital content playing device 520 receives the content file, it records it on the registry of the memory section 524 or the recording medium set to the copy section 525. When it receives the piece data "D" and decryption key, it records them on a piece data registry different from the predetermined registry of the memory section 524 on which the content file is recorded. A predetermined flag is set.

Thereafter, when the playing software is executed by the user (When the content file is recorded on a recording medium, the playing software is executed and the recording medium is set.), the digital content playing device 520 display outputs the playing software on the output section 522. The content information "A2" of the content file recorded on the memory section 524 or the recording medium is read, and the content file is displayed on the play list on the screen of the playing software (s1). The play list displays the file name of the content file and the message that the content file is rented. It displays a message that the content file in which a predetermined flag is set is rented. Based on the play list, whether the rented content file is play operated via the operation section 523 or not is decided (s2).

When it is decided that the play operation is not performed, whether a request to play an unrented content file is made via the operation section 523 or not based on the play list (s3). That is, whether a request to re-rent the content file whose rental period has ended is made or not is decided. When it is decided that the play request is made, the content information "A2" of the content file on the memory section 524 or recording medium is read to transmit the content ID based on the WEB address included in the content information "A2" and a message to perform play request processing via the communication line β to the delivery management center 510. The delivery management center 510 transmits data necessary for play request processing via the communication line β to the digital content playing device 520. The digital content playing device 520 display outputs the play requesting screen on the output section 522 based on the data (s4).

The user sequentially inputs or selects a rental period (by which a rental fee amount is automatically determined) via the operation section 523 as indicated on the play requesting screen. Finally, when the user ID and password are inputted as a play request of the content file via the operation section 523 (s5), the digital content playing device 520 switches the displayed output of the output section 522 to the authentication screen and transmits the inputted request data via the communication line β to the delivery management center 510. In this case, the content ID of the content information "A2" on the memory section 524 or the recording medium and the player ID on the memory section 524 are read and transmitted to the delivery management center 510 together with the request data (s6).

The delivery management center 510 checks authentication of the user related to the request. It refers to the transmitted user ID, player ID and the like of the user, and reads the user information of the user from the user information DB 514 to check whether the user is an authorized user or not. The delivery management center 510 prepares an inadequate persons list indicating persons having over predetermined nonpayment of rental fee in the user information DB 514 and checks whether the user is a not person corresponding to the inadequate persons list together with the authentication (The check of the inadequate persons list is arbitrary.).

When the delivery management center 510 confirms that the user related to the request is an unauthorized user or a person corresponding to the inadequate persons list although he/she is an authorized user, a message to deny the request of the user is transmitted via the communication line β to the digital content playing device 520.

On the other hand, when the delivery management center 510 confirms that the user related to the request is an authorized user and a person not corresponding to the inadequate persons list, it refers to the player ID and the like of the user to record a charge in the user information on the user information DB 514 of the user, searches the piece data DB 516 to read the piece data "D" and the decryption key corresponding to the content ID, and transmits them as a reply to approve the request of the user via the communication line β to the digital content playing device 520. Charging is performed as described above.

The digital content playing device 520, when the message to deny the request of the user is transmitted from the delivery management center 510 via the communication line β (s7), display outputs an error message on the output section 522 (s8).

When the piece data "D" and the decryption key are transmitted as the reply to approve the request of the user from the delivery management center 510 via the communication line β (a7), a predetermined flag is set, and the piece data "D" and the decryption key are recorded on the above-described piece data registry of the memory section 524 (s9). At the same time, the clock function of the computer is used to record the piece data transmission date on the memory section 524. The playlist is display outputted on the output section 522 (s1).

The digital content playing device 520, when the rented content file is play operated via the operation section 523 based on the play list (s2), reads the decryption key from the memory section 524 to decrypt the piece data "D". Based on the piece data "D", the data body d is read to read another decryption key from the memory section 524 to decrypt and play the data body d (s10). The program of the playing software is ended by performing ending processing by the user.

The playing software has the above basic function and a piece data management function resident in the digital content playing device 520 of managing the piece data "D" when the power of the digital content playing device 520 is turned on. By the piece data management function, the piece data "D" on the memory section 524 is managed, and the difference between the piece data transmission date and the current date is determined as an elapsed period from the point of time at which the piece data "D" is transmitted. When it reaches the rental period included in the rental information, it is decided that it is not within the rental period to delete the piece data "D" and the decryption key on the memory section 524 to unset a predetermined flag.

The unauthorized play prevention system 500 can obtain the content file and the piece data "D" at the same time. As compared with Embodiment 4, the authorized temporal use of the content file can be made easy. The piece data "D" of the content file whose rental period has elapsed is deleted to prevent secondary unauthorized use. When the content file is recorded by the user on the recording medium, the play information "A1" included in the header information "A" is lacked from the content file recorded on the recording medium. Therefore, unless the piece data "D" is obtained as an authorized play requester, it cannot be played. Tertiary unauthorized use can be also prevented.

Not within the rental period of the digital content, the piece data "D" and the like on the memory section 224 is automatically deleted. The content file remains the same. Not within the rental period, the digital content playing device 520 can be used to copy the content file to another recording medium. To play the content file on the recording medium, the digital content playing device 520 can be used to reliably collect charges for secondary and tertiary uses since authentication and payment of the rental fee to the delivery management center 510 are necessary.

The unauthorized play prevention system 500 has: delivery management means which is a server in which a content file having header information and a data body is prepared in a state of lacking part of the header information and the part of the header information is prepared as piece data and delivers the content file via a communication line and manages use of the data body; and a digital content playing device capable of communicating via the communication line with the delivery management means and used for at least playing the content file delivered from the delivery management means, wherein when a request to download the content file is inputted by a user to the digital content playing device, the digital content playing device transmits the request via the communication line to the delivery management means, the delivery management means transmits the content file related to the request via the communication line to the digital content playing device, thereafter, when a request to play the content file under an authentication condition is inputted by the user to the digital content playing device, the digital content playing device transmits the request via the communication line to the delivery management means, the delivery management means checks authentication of the user related to the request to transmit piece data of the content file related to the request via the communication line to the digital content playing device, and the digital content playing device uses the header information of the transmitted content file and the piece data in play operation to play the data body of the content file. Any design change can be made to the unauthorized play prevention system 500 of such configuration.

The delivery management center 510 has one digital content DB 511, but may have more. In this case, for example, a movie content file may be stored in a first DB and a music content file may be stored in a second DB. That is, different kinds of content files may be stored in DBs. The content files stored in the DBs may be the same to prevent access to the first DB from being concentrated at congestion. The same thing applies to the piece data DB 516. The delivery management center 510 has the digital content DB 511 and the piece data DB 516. The digital content DB 511 and the piece data DB 516 may be installed in locations different from the delivery management center 510. In this case, the delivery management center 510 authenticates the user to transmit the WEB address of the digital content DB 511 and the piece data DB 516 to the digital content playing device 520. The digital content playing device 520 may access the digital content DB 511 and the piece data DB 516 based on the WEB address to obtain the content file and piece data "D".

As for the digital content DB 511, the content file having the header information "A" and the data body "B" is recorded in a state of lacking the play information "A1" included in the header information a. It can be, of course, recorded in a state of adding other information. As for other information, there is a program or the like which decides whether the playing software is installed on the computer of the user or not, and when deciding that it is not installed, automatically accesses the HP of the delivery management center 510. When the program is recorded and the user executes the obtained content file on his/her own computer (computer corresponding to the digital content playing device 520 in a state that the playing software is not downloaded), the WEB address of the delivery management center 510 is read to automatically access the delivery management center 510 based on this. When obtaining the playing software by the above procedure, the content file on the memory section 524 can be played.

The content of the playing software are only an example. Changing timing at which user registration and user authentication are performed and changing the content or the like is arbitrary. When the content file is recorded on the memory section 524 of the digital content playing device 520 and the rental period has elapsed, the content file may be deleted together with the piece data "D". Aside from the piece data "D", an elapsed period from the point of time at which the content file is received may be determined, and when the elapsed period reaches a predetermined period, the content file may be deleted.

The fifth embodiment can be design changed to a system preventing unauthorized use of the content file delivered for pay or for free, not rented. In this case, it has the same merit as above. The playing software used in this case may only delete processing when the delivered content file is not within the rental period. The digital content playing device 520, without downloading the playing software from the delivery management center 510, may download it via a recording medium such as a CD. As a matter of course, it may be an exclusive device, not a computer.

Needless to say, timing at which the piece data "D" can be obtained can be suitably design changed according to the content of the system.

The invention claimed is:

1. A system for preventing unauthorized play of digital content, comprising:
   a distributing recording medium selected from a general recording medium group consisting of a CD and a DVD, in which a content file having partial header information and a data body is recorded, wherein an omitted part of the header information is absent from the distributing recording medium, and wherein the omitted part of the header information is needed by a digital content playing device to play the data body;
   a bank or credit card company communicatively coupled to the Internet with a communication line;
   a management unit communicatively coupled to the Internet with the communication line, the management unit configured to manage use of the content file on the distributing recording medium and capable of transferring a piece of data via the communication line, wherein the communication line is configured to communicate the piece of data after a charge is collected from the bank or credit card company, and wherein the piece of data includes the omitted part of the header information; and
   a digital content playing device communicatively coupled to the Internet with the communication line, the digital content playing device configured to play the content file on the distributing recording medium and having a function of communicating via the communication line with the management unit;
   wherein in response to detecting a request to play the content file under authentication and charging conditions input by a user to the digital content playing device, the digital content playing device transfers the request via the communication line to the management unit, the management unit checks authentication and charging of the user related to the request before transferring the piece of data via the communication line to the digital content playing device, and the digital content playing device uses the partial header information on the distributing recording medium and the piece of data in a play operation to play the data body on the distributing recording medium.

2. A system for preventing unauthorized play of digital content comprising:
   a distributing recording medium selected from a general recording medium group consisting of a CD and a DVD, in which a content file having partial header information and a data body is recorded in a state of lacking an omitted part of the header information, and wherein the omitted part of the header information is needed by a digital content playing device to play the data body;
   a bank or credit card company communicatively coupled to the Internet with a communication line;
   a management unit communicatively coupled to the Internet with the communication line, the management unit configured to manage use of the content file on the distributing recording medium and capable of transmitting a piece of data via the communication line, wherein the communication line is configured to communicate the piece of data after a charge is collected from the bank or credit card company, and wherein the piece of data includes the omitted part of the header information; and
   a digital content playing device communicatively coupled to the Internet with the communication line, the digital content playing device configured to play the content file on the distributing recording medium and having a function of communicating via the communication line with the management unit, wherein
   in response to a request to play the content file input by a user to the digital content playing device, the digital content playing device transmits the request via the communication line to the management unit, the management unit checks authentication of the user related to the request before transmitting the piece of data via the communication line to the digital content playing device, and the digital content playing device uses the partial header information on the distributing recording medium and the piece of data in a play operation to play the data body on the distributing recording medium.

3. A distributing recording medium fabrication device used for the system for preventing unauthorized play of digital content according to claim 1, configured to:
   separate the omitted part of the header information from a content file having header information and data body for recording; and
   record the content file without the omitted part of the header information on a recording medium received in the fabrication device to create a distributing recording medium.

4. A digital content playing device used for the system for preventing unauthorized play of digital content according to claim 1, which has the functions of:
   in response to detecting a request to play the content file input by the user, transmitting the request via the communication line to the management unit; and thereafter,
   in response to receiving the piece of data from the management unit via the communication line, using the partial header information on the distributing recording medium and the piece of data in play operation to play the data body on the distributing recording medium.

5. A recording medium storing playing software used for the system for preventing unauthorized play of digital content according to claim 1, wherein the digital content playing device is a computer and the playing software is processed by the computer, and wherein the system is configured such that:
   in response to detecting a request to play the content file input by the user, the request is transmitted via the communication line to the management unit; and thereafter:
   in response to receiving the piece of data from the management unit via the communication line, the partial header information on the distributing recording medium and the piece of data are used in play operation to play the data body on the distributing recording medium.

6. A system for preventing the unauthorized play of digital content, comprising:

a bank or credit card company communicatively coupled to the Internet with a communication line;

a delivery management unit communicatively coupled to the Internet with the communication line, the delivery management unit configured to deliver a content file having partial header information and a data body via the communication line and managing use of the data body, wherein the partial header information does not include an omitted part of the header information, and wherein the omitted pan of the header information is needed by a digital content playing device to play or copy the data body; and a digital content playing device communicatively coupled to the Internet with the communication line, the digital content playing device capable of communicating via the communication line with the delivery management unit and used for at least playing the content file delivered from the delivery management unit;

wherein in response to detecting a request to download the content file input by a user to the digital content playing device, the digital content playing device transfers the request via the communication line to the delivery management unit, the delivery management unit transfers the content file related to the request via the communication line to the digital content playing device, wherein the communication line is configured to communicate a piece of data after a charge is collected from the bank or credit card company, wherein the piece of data includes the omitted part of the header information;

wherein in response to detecting a request to play the content file under authentication and charging conditions input by the user to the digital content playing device, the digital content playing device transfers the request via the communication line to the delivery management unit, the delivery management unit checks authentication and charging of the user related to the request to transfer the piece of data via the communication line to the digital content playing device; and wherein the digital content playing device uses the partial header information of the transferred content file and the piece of data in a play operation to play the data body of the content file.

7. A system for preventing unauthorized play of digital content comprising:

a bank or credit card company communicatively coupled to the Internet with a communication line;

a delivery management unit which is a server communicatively coupled to the Internet with the communication line, the server configured to store a content file having partial header information and a data body in a state of lacking an omitted part of the header information, wherein the omitted part of the header information is needed by a digital content playing device to play the data body, and wherein the omitted part of the header information is prepared as a piece of data, the server further configured to deliver the content file via a communication line and to manage use of the data body; and a digital content playing device communicatively coupled to the Internet with the communication line that is communicatively coupled to the bank or credit card company and the delivery management unit, the digital content playing device configured at least to play the content file delivered from the delivery management unit using the partial header information and the omitted part of the header information;

wherein in response to detecting a request to download the content file input by a user to the digital content playing device, the digital content playing device transmits the request via the communication line to the delivery management unit, the deliver) management unit transmits the content file related to the request via the communication line to the digital content playing device, wherein the communication line is configured to communicate the piece of data after a charge is collected from the bank or credit card company;

wherein in response to detecting a request to play the content file input by the user to the digital content playing device, the digital content playing device transmits the request via the communication line to the delivery management unit, the delivery management unit checks authentication of the user related to the request to transmit the piece of data of the content file related to the request via the communication line to the digital content playing device; and wherein the digital content playing device uses the partial header information of the transmitted content file and the piece of data in a play operation to play the data body of the content file.

8. A digital content playing device used for the system for preventing unauthorized play of digital content according to claim 6, configured to:

in response to detecting a request to download the content file input by a user, transmit the request to download the content file via the communication line to the delivery management unit;

receive the content file from the delivery management unit;

in response to detecting a request to play the content file input by the user, transmit the request to play the content file via the communication line to the delivery management unit; and in response to receiving the piece of data from the delivery management unit via the communication line, use the partial header information of the transmitted content file and the piece of data in play operation to play the data body of the content file.

9. A recording medium storing playing software used for the system for preventing unauthorized play of digital content according to claim 6, wherein the digital content playing device is a computer and the playing software is processed by the computer, and in which the system is configured to:

in response to detecting a request to download the content file input by the user, transmit the request to download the content file via the communication line to the delivery management unit;

in response to detecting a request to play the content file, transmit the request to play the content file via the communication line to the delivery management unit; and in response to transmission of the piece of data from the delivery management unit via the communication line, use the partial header information of the transmitted content file and the piece of data in play operation to play the data body of the content file.

10. The system for preventing unauthorized play of digital content according to claim 1, wherein the digital content playing device is configured to:

determine an elapsed period from a point of time at which the piece of data is transmitted from the management unit or the delivery management unit; and in response to determining that the elapsed period has reached a predetermined period, delete the transferred piece of data.

11. The digital content playing device used for the system for preventing unauthorized play of digital content according to claim 4, which is configured to:

determine an elapsed period from a point of time at which the piece of data is transmitted from the management unit or the delivery management unit; and in response to determining that the elapsed period has reached a predetermined period, delete the received piece of data.

12. The recording medium according to claim 5, wherein the system is further configured such that:

an elapsed period from a point of time at which the piece of data is transmitted from the management unit or the delivery management unit is determined; and in response to determining that the elapsed period has reached a predetermined period, the transmitted piece of data is deleted.

13. The system for preventing unauthorized play of digital content according to claim 1, wherein the digital content playing device is a computer, wherein playing software processed by the computer is prepared in the management unit or the delivery management unit, wherein the digital content playing device is configured to transmit a request to download the playing software via the communication line to the management unit or the delivery management unit, and wherein the digital content playing device is configured to download the playing software related to the request from the management unit or the delivery management unit via the communication line.

14. The system for preventing the unauthorized play of digital content according to claim 2, wherein the request to play the content file input by the user is made under an authentication and charging condition of the user.

15. The system for preventing unauthorized play of digital content according to claim 10, wherein the digital content playing device is configured to:

determine an elapsed period from a point of time at which the content file is transmitted from the delivery management unit; and in response to determining that the elapsed period has reached a predetermined period, delete the content file.

16. The digital content playing device used for the system for preventing unauthorized play of digital content according to claim 11, wherein the digital content playing device is configured to:

determine an elapsed period from a point of time at which the content file is transmitted from the delivery management unit; and in response to determining that the elapsed period has reached a predetermined period, delete the content file.

17. The recording medium according to claim 12, wherein the system is further configured such that:

an elapsed period from a point of time at which the content file is transmitted from the delivery management unit is determined; and in response to determining that the elapsed period has reached a predetermined period, the content file is deleted.

\* \* \* \* \*

UNITED STATES PATENT AND TRADEMARK OFFICE
CERTIFICATE OF CORRECTION

| | |
|---|---|
| PATENT NO. | : 8,584,249 B2 |
| APPLICATION NO. | : 10/533583 |
| DATED | : November 12, 2013 |
| INVENTOR(S) | : Okamoto et al. |

Page 1 of 4

It is certified that error appears in the above-identified patent and that said Letters Patent is hereby corrected as shown below:

In the Drawings:

Drawing sheets, consisting of Figs. 4 and 9, should be deleted to be replaced with the drawing sheets, consisting of Figs. 4 and 9, as shown on the attached pages.

In the Specification:

In Column 1, Line 27, delete "2002-334172"" and insert -- 2002-334172". --, therefor.

In Column 7, Line 27, delete "cc" and insert -- $\alpha$ --, therefor.

In Column 7, Line 45, delete "body "B"" and insert -- body "B". --, therefor.

In Column 9, Line 21, delete "cc" and insert -- $\alpha$ --, therefor.

In Column 10, Line 16, delete "sane" and insert -- same --, therefor.

In Column 11, Line 22, delete "cc," and insert -- $\alpha$, --, therefor.

In Column 13, Line 5, delete "cc;" and insert -- $\alpha$; --, therefor.

In Column 16, Line 12, delete "cc," and insert -- $\alpha$, --, therefor.

In Column 16, Line 17, delete "cc." and insert -- $\alpha$. --, therefor.

In Column 16, Line 28, delete "cc," and insert -- $\alpha$, --, therefor.

In Column 16, Line 34, delete "cc," and insert -- $\alpha$, --, therefor.

In Column 16, Line 38, delete "cc," and insert -- $\alpha$, --, therefor.

In Column 17, Line 8, delete "cc." and insert -- $\alpha$. --, therefor.

Signed and Sealed this
First Day of July, 2014

Michelle K. Lee
*Deputy Director of the United States Patent and Trademark Office*

CERTIFICATE OF CORRECTION (continued)
U.S. Pat. No. 8,584,249 B2

In Column 17, Line 64, delete "cc," and insert -- α, --, therefor.

In Column 18, Line 21, delete "αtransferred" and insert -- α transferred --, therefor.

In Column 19, Line 21, delete "cc," and insert -- α, --, therefor.

In Column 19, Line 34, delete "numeral 324, a play copy section" and insert -- numeral 325, a play copy section --, therefor.

In Column 20, Line 54, delete "cc" and insert -- α --, therefor.

In Column 21, Line 50, delete "cc." and insert -- α. --, therefor.

In Column 22, Line 25, delete "cc," and insert -- α, --, therefor.

In Column 23, Line 15, delete "numeral 424, a play copy section" and insert -- numeral 425, a play copy section --, therefor.

In the Claims:

In Column 34, Line 36, in Claim 3, delete "and" and insert -- and a --, therefor.

In Column 35, Line 10, in Claim 6, delete "pan" and insert -- part --, therefor.

In Column 36, Line 3, in Claim 7, delete "deliver)" and insert -- delivery --, therefor.